(12) United States Patent
Young et al.

(10) Patent No.: US 12,159,367 B2
(45) Date of Patent: Dec. 3, 2024

(54) CLOUD COMPUTING FLEXIBLE LARGE AREA MOSAIC ENGINE

(71) Applicant: Maxar Intelligence Inc., Westminster, CO (US)

(72) Inventors: Patrick Young, Westminster, CO (US); Peter Schmitt, Westminster, CO (US); Tim Harris, Westminster, CO (US)

(73) Assignee: Maxar Intelligence Inc., Westminster, CO (US)

( * ) Notice: Subject to any disclaimer, the term of this patent is extended or adjusted under 35 U.S.C. 154(b) by 309 days.

(21) Appl. No.: 16/964,292

(22) PCT Filed: Jan. 28, 2019

(86) PCT No.: PCT/US2019/015421
§ 371 (c)(1),
(2) Date: Jul. 23, 2020

(87) PCT Pub. No.: WO2019/148104
PCT Pub. Date: Aug. 1, 2019

(65) Prior Publication Data
US 2021/0035265 A1 Feb. 4, 2021

Related U.S. Application Data

(60) Provisional application No. 62/622,716, filed on Jan. 26, 2018.

(51) Int. Cl.
*G06T 3/4038* (2024.01)
*G06N 7/01* (2023.01)
(Continued)

(52) U.S. Cl.
CPC ............. *G06T 3/4038* (2013.01); *G06N 7/01* (2023.01); *G06T 7/187* (2017.01); *G06T 7/207* (2017.01)

(58) Field of Classification Search
CPC ....... G06T 3/4038; G06T 7/187; G06T 7/207; G06T 11/00; G06T 11/60; G06T 17/00;
(Continued)

(56) References Cited

U.S. PATENT DOCUMENTS 6,741,255 B1 * 5/2004 Furlani et al. .......... G06T 11/60
345/537
10,127,632 B1 * 11/2018 Burke ................... G06T 3/4038
(Continued)

OTHER PUBLICATIONS

International Search Report and Written Opinion, for Application No. PCT/US2019/015421, mailed Apr. 25, 2019.

*Primary Examiner* — Gandhi Thirugnanam
(74) *Attorney, Agent, or Firm* — Harness, Dickey & Pierce, P.L.C.

(57) ABSTRACT

Systems and methods for large-scale geospatial mosaic generation with image processing in a cloud computing environment. The approaches described herein specifically leverage scalable cloud computing features to facilitate highly parallel, granular image processing. Front-end image processing techniques allow for generation of a user interface that may provide automated material selection with human operator refinement. The user interface may be a web-based design that provides browse version images at lower resolutions to improve performance of the user interface and generating mosaic recipe. In turn, the mosaic recipe may be provided to back-end image processing that coordinates strip-level jobs and tile-level jobs and highly parallel fashion scalable cloud computing nodes. In turn, very large-scale mosaic images may be generated from geospatial images in computationally and cost-effective manner.

26 Claims, 18 Drawing Sheets

(51) Int. Cl.
*G06T 7/187* (2017.01)
*G06T 7/207* (2017.01)

(58) Field of Classification Search
CPC ............. G06T 17/05; G06T 2207/20; G06T 2207/20084; G06T 5/50; G06T 2207/10032; G06T 2207/10028; G06T 2207/30181; G06T 2200/32; G06T 2207/20021; G06T 2207/10036; G06T 2207/30232; G06T 2207/30212; G06T 2219/024; G06T 5/009; G06T 3/40; G06T 2207/20212; G06T 2207/20221; G06T 2200/00; G06T 7/30; G06T 7/33; G06N 7/005; G06N 3/04; G06N 3/0454; G06F 16/29; G06F 16/20; H04N 5/23238; G08G 1/0969; G01C 21/3679; G01C 21/38; G09G 5/377; G09G 2340/12; G09G 5/38

See application file for complete search history.

(56) References Cited

U.S. PATENT DOCUMENTS

| | | | |
|---|---|---|---|
| 10,176,194 B2 * | 1/2019 | Har-Noy | G06Q 10/101 |
| 2005/0270299 A1 | 12/2005 | Rasmussen et al. | |
| 2013/0271490 A1 * | 10/2013 | Brown | G03B 37/04 |
| | | | 345/629 |
| 2013/0271638 A1 * | 10/2013 | Brown | G01C 15/00 |
| | | | 348/333.12 |
| 2014/0096021 A1 | 4/2014 | Gowen et al. | |
| 2014/0267390 A1 | 9/2014 | Padwick et al. | |
| 2014/0270478 A1 | 9/2014 | Chen et al. | |
| 2014/0270569 A1 * | 9/2014 | Padwick | G06T 3/4038 |
| | | | 382/274 |
| 2015/0264122 A1 | 9/2015 | Shau et al. | |
| 2015/0339530 A1 | 11/2015 | Neckels et al. | |
| 2015/0363641 A1 * | 12/2015 | Navulur | G09B 29/106 |
| | | | 382/113 |
| 2016/0300375 A1 * | 10/2016 | Beckett | G06F 16/248 |
| 2017/0041550 A1 * | 2/2017 | Swanson | G06F 16/51 |
| 2021/0035265 A1 * | 2/2021 | Young | G09G 5/14 |

\* cited by examiner

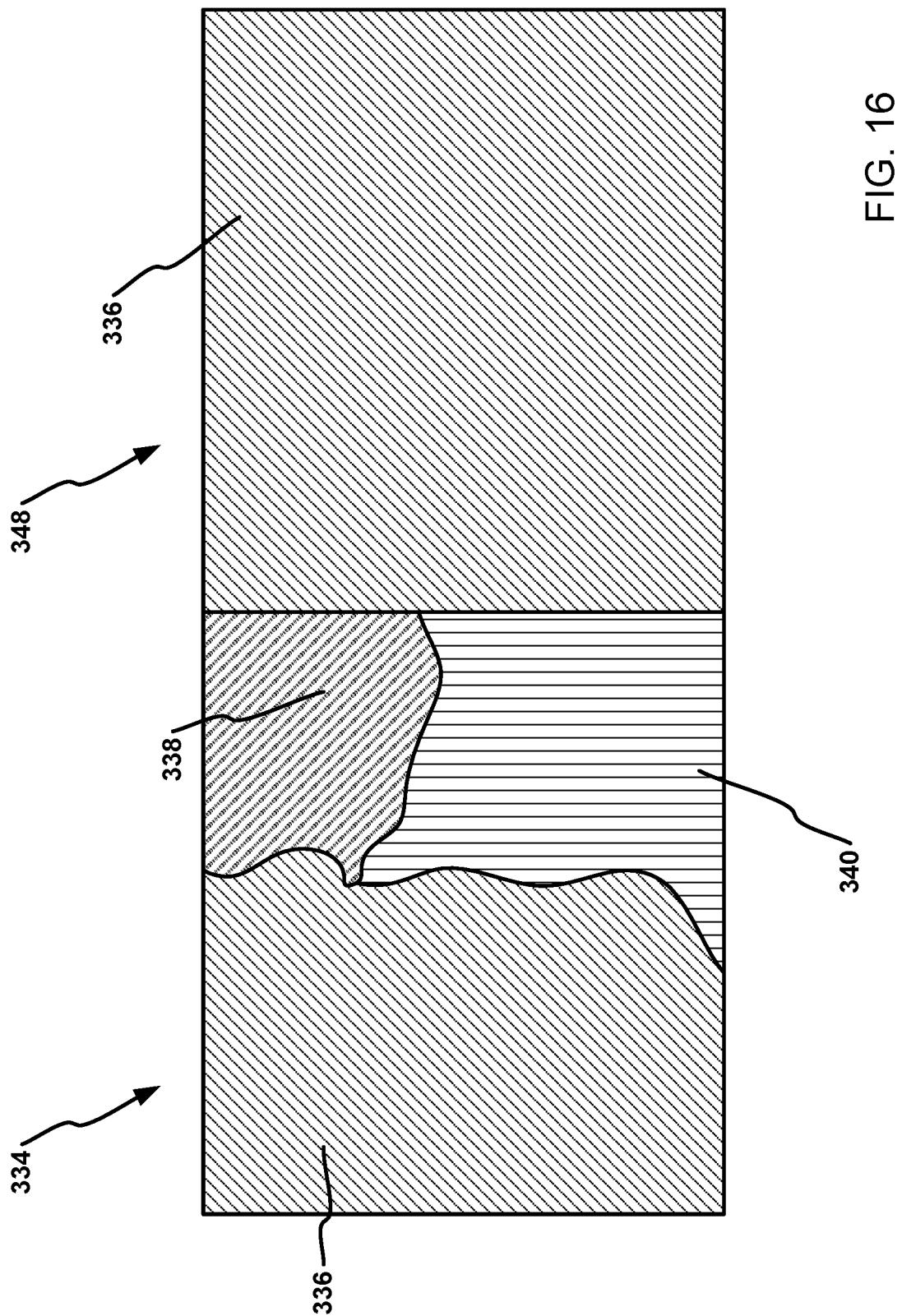

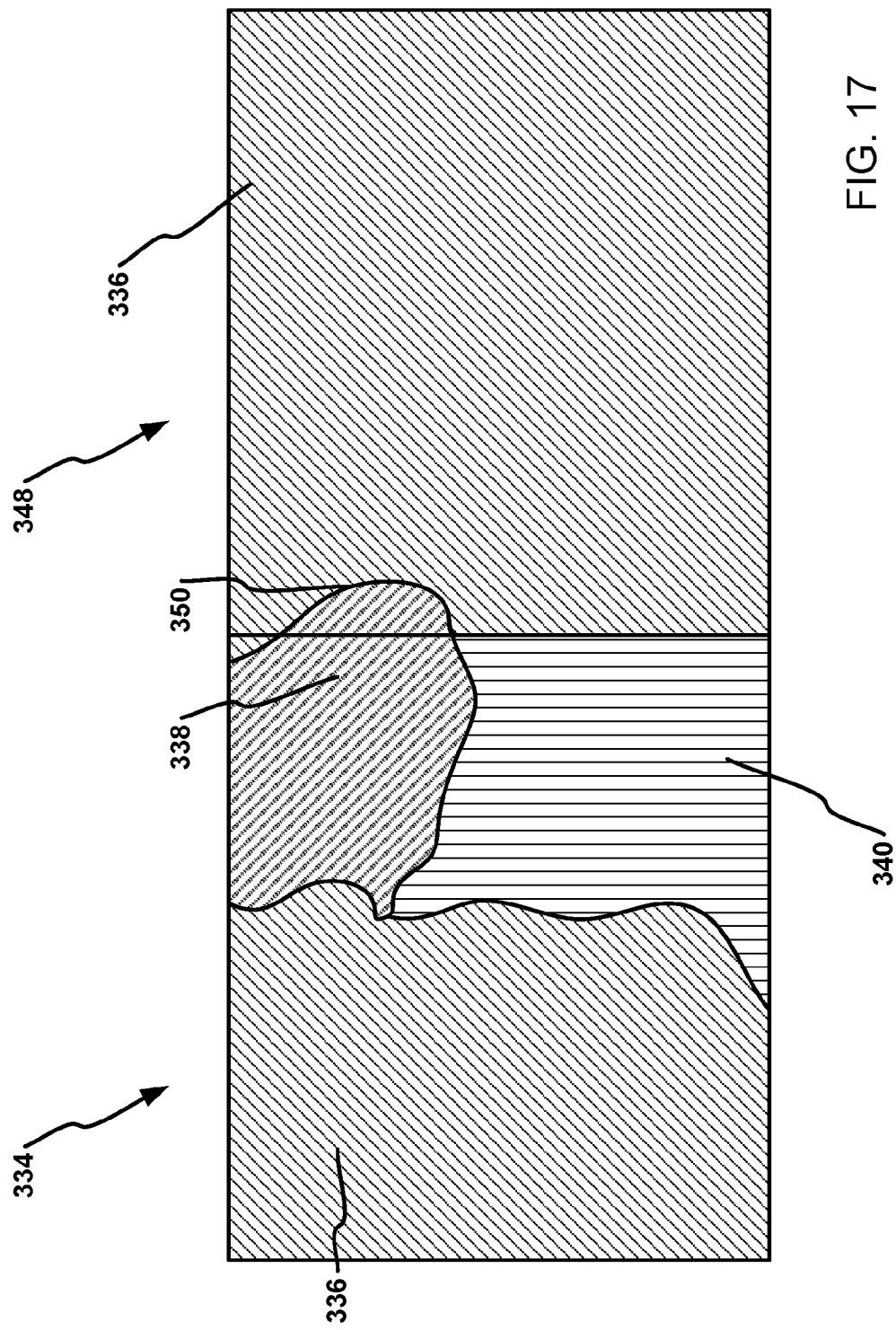

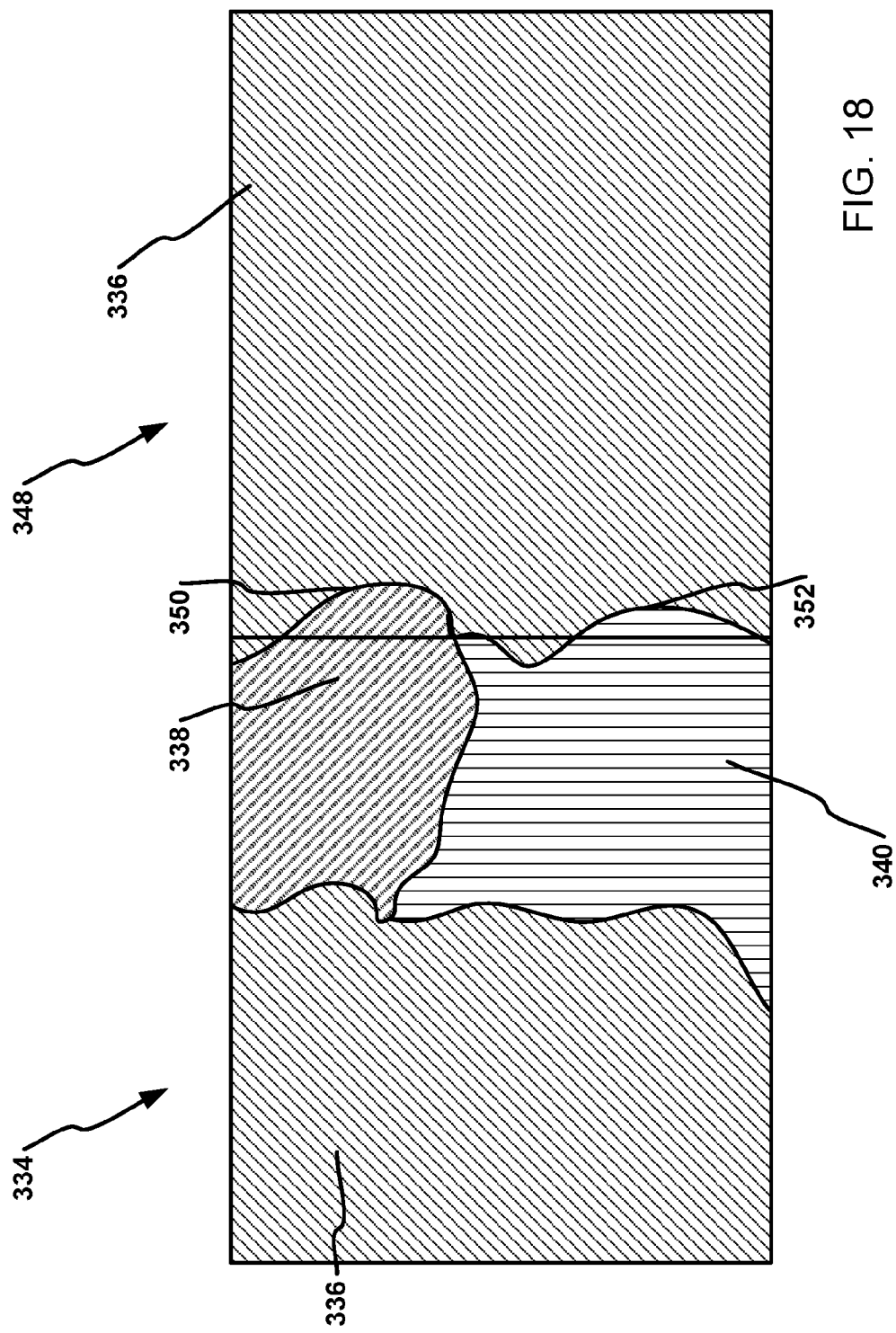

CLOUD COMPUTING FLEXIBLE LARGE AREA MOSAIC ENGINE

CROSS REFERENCE TO RELATED APPLICATIONS

The present application is a U.S. National Stage of international Application No. PCT/US2019/015421 filed 28 Jan. 2019, which claims priority to and the benefit of U.S. Provisional Application No. 62/622,716 entitled "CLOUD COMPUTING FLEXIBLE LARGE AREA MOSAIC ENGINE" filed Jan. 26, 2018, the entirety of which is incorporated by reference herein.

FIELD

The present disclosure generally relates to processing of digital imagery, and in particular to the processing of digital geospatial imagery to generate a geospatial mosaic image.

BACKGROUND

High resolution images of selected portions of a celestial body's surface have become a product desired and used by government agencies, corporations, and individuals. For instance, many consumer products in common use today include images of the Earth's surface, such as Google® Earth and other mapping products. Various types of remote sensing image collection platforms may be employed, including aircraft, earth-orbiting satellites, and the like.

In the case of a consumer digital camera, for instance, an image sensor is generally arranged in an area array (e.g., 3,000 rows of 3,000 pixels each, or 9,000,000 total pixels) which collects the image area in a single "snapshot." However, satellite-based imaging often functions on the "push-broom scanning" principle whereby each image sensor includes a relatively small number of rows (e.g., a couple) of a great number of pixels (e.g., 50,000) in each row. Each row of pixels is scanned across the earth to build an image line by line, and the width of the image is the product of the number of pixels in the row times the pixel size or resolution (e.g., 50,000 pixels at 0.5 meter ground resolution produces an image that is 25,000 meters wide). The length of the image is controlled by the scan duration (i.e. number of lines), which is typically selectable for each image collected. Given the arrangement of the sensors in a typical satellite-based imaging system, often long, narrow strips of images are acquired. The resolution of satellite images varies depending on factors such as the particular instrumentation utilized, the altitude of the satellite's orbit, and the like.

To allow for the extraction of additional information from the radiance received at a satellite after being reflected from the Earth's surface (which may include atmospheric effects such as from aerosols, clouds, etc.), multi-spectral imaging may be employed. Specifically, multi-spectral imaging captures image data at specific frequencies or wavelengths across the electromagnetic spectrum, including those in the visible light range as well as those beyond or outside of the visible light range (e.g., near infrared (NIR), short wave infrared (SWIR), far infrared (FIR), etc.). For instance, a satellite may have one image sensor (e.g., radiometer) that is sensitive to wavelengths (e.g., high resolution data) across only a first spectral band (e.g., the visible light band, 0.38-0.75 µm) in addition to one or more additional image sensors that are sensitive to wavelengths only across other spectral bands (e.g., NIR, 0.75-1.4 µm; SWIR, 1.4-3 µm; etc.).

Due to the nature of image acquisition, a number of geospatial images may be pieced together to form a geospatial mosaic (e.g., an orthomosaic) of a collection of geospatial images that cover a larger geographic area than may be feasibly covered with a single acquired image. In this regard, it may be appreciated that the images that form such a geospatial mosaic may be acquired at different times or may be acquired using different collection techniques or with different collection parameters. In situations where more than one image is available for a given region of interest on the ground, it may be desirable to use the most recent image absent countervailing considerations such as image properties like cloud cover, snow cover, seasonality, or other circumstance that may create undesirable image artifacts or features. Also, various artifacts can be introduced when multiple separate images are combined into an orthomosaic and are preferably minimized or eliminated.

Up until recently, proposed techniques for geospatial mosaic generation have included manual selection of images by a human operator. Generally, the human operator is tasked with reviewing all available images for an area of interest and choosing images for inclusion in the orthomosaic utilizing what the human operator subjectively determines to be the "best" source images. The subjective determinations of the human operator are often guided by a principle that it is preferential to include as few images in the mosaic as possible. In turn, a geospatial mosaic may be generated utilizing the human-selected images to form the mosaic. As may be appreciated, this human operator-centric process may be time consuming and costly. Moreover, the image selection is subjective to the human user. Furthermore, computational processes to process the human-selected images may include bulk processing of all geospatial images to be included in the resulting mosaic, which can provide disadvantages as will be described in greater detail below. It is against this background that the techniques disclosed herein have been developed.

SUMMARY

The present disclosure relates to system architectures and related methodology that allow for generation of large-scale geospatial mosaic images in a scalable, cloud computing environment. Accordingly, the embodiments described herein may facilitate reduction or elimination to the disadvantages noted above in relation to previously proposed geospatial mosaic generation. Specifically, the approaches described herein for generation of a geospatial mosaic image by a flexible large area mosaic engine ("FLAME") may be particularly suited for processing very large digital geospatial image files. The mosaic engine may be executed in a cloud computing environment that has scalable cloud-based computational and memory resources. This may allow for, time and cost efficient generation of high-quality geospatial mosaic images.

In contrast to previously proposed approaches for generation of geospatial mosaic images, the present approach may be particularly adapted to be efficiently executed in cloud computing environments described herein. For instance, conventional approaches to geospatial mosaic generation may include identification and collection of all geospatial images to be included in the mosaic image at a given computational node such as a local computer device. In turn, the conventional approach includes collective processing on the entirety of the geospatial images to be utilized to generate the mosaic image. While such a conventional approach could be executed in a cloud computing environment, the present disclosure provides specific approaches that leverage the benefits of a scalable cloud computing cluster environment to provide increased computational efficiency to generate a geospatial mosaic image rather than merely executing a conventional approach in a cloud environment.

In a first regard, the present disclosure specifically contemplates division of an area of interest for which a geospatial mosaic image is to be generated into geographically indexed tiles comprising sub-portions of the area of interest. Additionally, geospatial images or "strips" may be correspondingly processed into image tiles of corresponding relation to the geographically indexed tiles of the area of interest. In turn, this approach provides increased granularity in relation to the processing of the image tiles generated from the strips. Advantageously, this facilitates highly parallel processing in which strip images may be decomposed and subjected to parallel processing for generation of a portion of the overall mosaic image at different computing nodes. In turn, the advantages associated with a scalable cloud computing cluster wherein computational memory resources may be scalable based on computational load can be fully taken advantage of in relation to the generation of the mosaic image. Namely, greedy algorithms or other similar approaches to controlling highly parallel processing may be applied such that the processing of the geospatial imagery for generation of the geospatial mosaic may be distributed among the plurality of computational nodes in a cloud computing environment. In one embodiment, a directed acyclic graphs (DAG) may be used in conjunction with a greedy algorithm to minimize the number of parallel processes that can be accomplished. That is, the DAG may define parent jobs and children jobs. The children jobs may be dependent upon the outcome of the processing associated with at least one parent job. In this regard, dependent children jobs may be processed or queued for processing upon completion of one or more parent jobs. Furthermore, it may be appreciated that more than one job (e.g., at the strip level or tile level) may be required on a given portion of a strip image or image tile to be processed. In this regard, processing of jobs may include parallel processing in which a given portion of a strip or image tile is used concurrently in more than one job. For instance, rather than required processing of an entire strip, the strip may be divided into image tiles with corresponding relation to a geographically indexed tile definition applied to the area of interest. In this regard, portions of the strip may be processed in parallel in multiple tile-level jobs rather than requiring processing to occur on the entirety of the strip, which may result in greater dependencies and reduced processing capability. Furthermore, multiple tile-level jobs may be executed in parallel for a given tile. For instance, if a tile is to include three image portions from three different source geospatial images, parallel tile-level processes may be defined to concurrently generate an intra-tile cutline between a first image portion and a second image portion at the same time that an intra-tile cutline is generated between the first image portion and a third image portion. Additionally or alternatively, concurrent processing to generate an intra-tile cutline between the second and the third image portion. That is, because the result of the generation of the intra-tile cutlines between the respective image portion may not affect the results of others of the operations, the operations may be performed in parallel, such as at different nodes or instances in a cloud computing cluster. This may include accessing respective instances of an image or image tile at one or more scalable cloud object storage instances. In this regard, a DAG may generate all available jobs based on the dependencies and parallel potential for processing to occur at either the strip-level or the tile-level for generation of the mosaic image. As such, the processing of tile-level jobs or strip-level jobs in this parallel fashion may avoid the need for all geospatial images or image tiles to be retrieved and located at a single computing node for serial processing as has been associated with the conventional approach to generation of mosaic images, thus improving the efficiency and allowing for leveraging of scalable cloud resources as the computational requirements of a given DAG expand and contract during the processing of the geospatial mosaic image.

In addition, the present disclosure contemplates both a front-end image processing module and a back-end image processing module. The front-end image processing module may employ particular geospatial image handling techniques that allow for advantages in relation to rendering geospatial images or representations thereof to a user on a display for generation of the mosaic recipe. For example, the front-end image processing module may employ in at least partially automated approach to material selection, which may significantly decrease the amount of human operator intervention required to generate the mosaic recipe. Furthermore, the advantages of the front-end image processing module including a unique web-based user interface, may allow for user-friendly and efficient evaluation of areas of interest in relation to initial mosaic generation and/or updating of existing mosaic images with newly acquired geospatial imagery. In addition, geospatial-specific file formats, geospatial-specific relational database arrangements, and geospatial-specific object-based storage may allow for efficient request and communication of digital geospatial images amongst cloud computing instances using standardized Internet protocol messaging. This, coupled with an improved approach to representation of very large geospatial images in a user interface may allow for an improved user interface experience when manipulating geospatial images for use in generation of geospatial mosaic images in connection with generating a mosaic recipe for the geospatial mosaic.

In turn, the present disclosure may facilitate very rapid, cost-efficient, user experience friendly generation of geospatial mosaic images for very large (e.g., potentially continental level) geospatial mosaics. Specifically, the unique approaches to processing of geospatial images to achieve the geospatial mosaic image may be particularly suited for highly granular, parallel processing in a cloud computing environment to generate a geospatial mosaic image. Accordingly, very large geospatial imagery catalogs may be leveraged by execution of the mosaic engine in the cloud-based environment as described herein to provide tonally consistent geospatial mosaic images with radiometric consistency between adjacent strip portions such that image artifacts associated with seams within the geospatial mosaic image may be minimized. These and other benefits of the mosaic image contemplated herein may be appreciated further in the discussion to follow.

BRIEF DESCRIPTION OF THE FIGURES

FIGS. 12-18 graphically depict a number of tile-level jobs (e.g., intra-tile and inter-tile jobs) performed to generate a portion of a geospatial mosaic.

DETAILED DESCRIPTION

Figure 1:
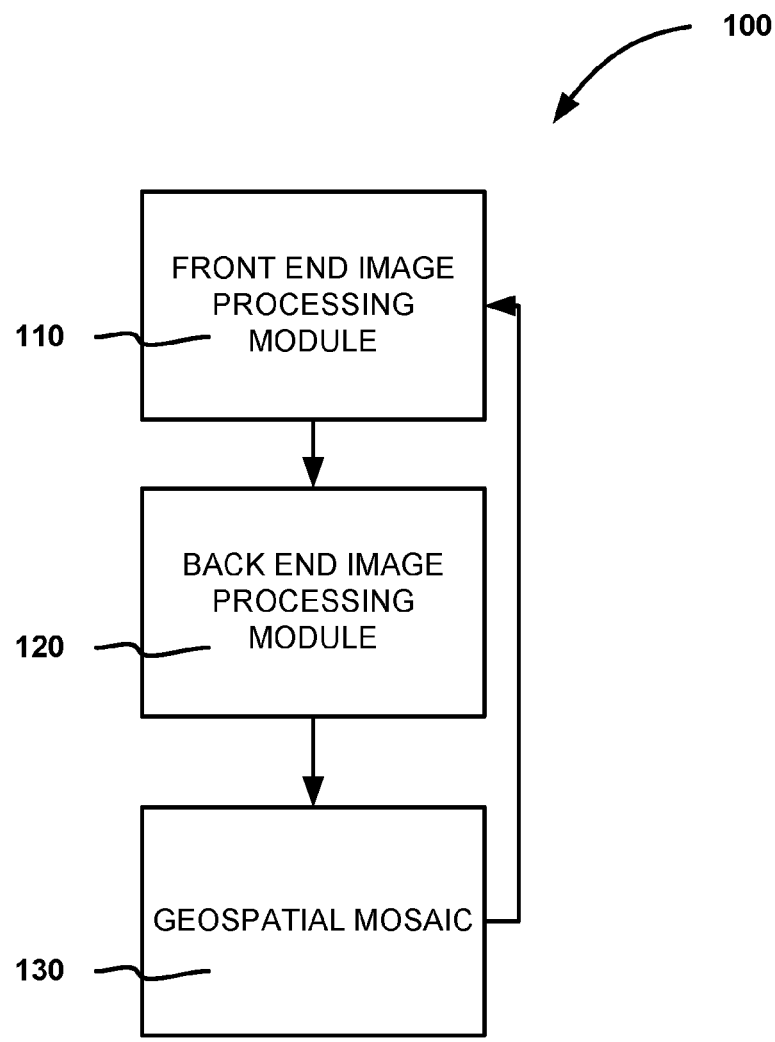
FIG. 1 depicts an embodiment of a flexible large area mosaic engine according to the present disclosure.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

FIG. 1 depicts an embodiment of a flexible large area mosaic engine or simply mosaic engine 100. The mosaic engine 100 generally includes a front-end image processing module 110 and a back-end image processing module 120. In operation, the front-end image processing module 110 may provide a user interface that allows a user to interact with the mosaic engine 100 to generate a mosaic recipe for an area of interest for which a geospatial mosaic image 130 is desired. As described in greater detail below, the front-end image processing module 110 may provide the mosaic recipe to the back-end processing module 120. In turn, the back-end processing module 120 may process geospatial images to produce the geospatial mosaic 130 according to the mosaic recipe. The front-end image processing module 110 may employ an initial automated materials selection process to retrieve and compile an initial selection of geospatial images for inclusion in the mosaic recipe in an automated fashion. The front-end image processing module 110 may allow for further manual selection and/or modification of geospatial images and their arrangements for generation of the mosaic recipe by allowing a user to modify the initial automated material selection of geospatial images. In turn, the back-end image processing module 130 may produce the mosaic image 130 according to the mosaic recipe. Furthermore, as depicted in FIG. 1, the mosaic image 130 may be utilized by the front-end image processing module 110 to provide quality assurance and/or quality control of the mosaic image 130. This may include use of the front-end image processing module 110 to refine portions of the mosaic image 130 (e.g., to address defects in the final mosaic or to update a previously generated mosaic image 130 with new imagery) as described in greater detail below.

Digital geospatial images can be massive in size. In turn, the digital image files corresponding to the geospatial images can have extremely large file sizes that occupy significant computer memory both for persistent storage and in working memory during digital processing of the images. Furthermore, communication of such large digital image files between computational components or computing nodes may require intensive bandwidth requirements. These factors provide significant challenges in relation to handling and processing of such large geospatial images. Moreover, as image resolution continues to increase, the size of such geospatial images in computer memory will continue to grow. In addition, processing of geospatial images to create a geospatial mosaic image 130 may be very computationally intensive, especially for geospatial mosaic images 130 at very high resolutions that cover a large geographic area.

In turn, the time and cost required to generate geospatial mosaic images 130 has often been prohibitive or near prohibitive in certain contexts. For instance, the conventional approach to generation of geospatial mosaic images has been to gather all geospatial imagery available for an area of interest. Many geospatial images are collected using a "push-broom" technique described above that results in relatively long, narrow "strip" images. Accordingly, geospatial images in their entirety may also be referred to herein as "strips" or "image strips." In any regard, the conventional approach to geospatial mosaic generation is to gather all available strips for an area of interest at a given processing node, define a stack order the strips in relation to a foreground and background direction, and thereafter collectively process the entirety of the geospatial imagery at the processing node to provide cutlines between the various image strips to generate a mosaic. However, given the computational complexity associated with such processing, the size of the mosaic is often limited to either a constrained geographic area or a limited number of strips for processing into the mosaic. Moreover, even with such constraints applied, the processing of the strips into the mosaic required significant time and cost to prepare. In addition, quality assurance or quality control was limited in the conventional context as any changes to a mosaic once generated may require reprocessing of all strips collectively to regenerate a mosaic after applying a change to the strips used and/or strip stack order. Further still, these conventional approaches do not allow for selection of a subset or a portion of a strip for use in the mosaic. In this regard, if a portion of the strip was desired to be used in a mosaic, but another portion was undesirable (e.g., due to cloud cover or other image defects), it was difficult or impossible to select portions of a strip for use in the final mosaic.

Accordingly, the present disclosure employs cloud computing infrastructure to deploy all or part of the mosaic engine 100 in a scalable manner that provides computational and time efficiencies in relation to generation of a geospatial mosaic 130. Such cloud computing environments are described in greater detail below in relation to detailed embodiments of the front-end image processing module 110 and the back-end image processing module 120 and related methods associated therewith for generation of a geospatial mosaic 130. In addition, the present disclosure employs decomposing or dividing an area of interest into a number of geographically indexed tiles. In turn, processing may be applied in relation to individual tiles rather than strips as a whole to provide a number of benefits relative to the conventional approach described above.

The approach described herein may provide particular advantages when executed in a cloud computing environment with scalable computational and memory resources. That is, while a traditional approach in which all geospatial imagery to be utilized in generation of the geospatial mosaic is collected a given computational node could be executed such that the given computational node at which such processing occurs is in a cloud computing environment, the present disclosure provides further advantages beyond the mere deployment of the conventional geospatial mosaic generation approach in a cloud computing environment. Rather, the utilization of tile-based processing of image tile portions generated from strip images to allow for highly parallel processing of image strips in a highly granular form is particularly suited to deployment in a cloud computing environment. For instance, scalable computational resources may be dedicated in a highly efficient manner in relation to highly parallel, granular job queues that may be created using the approaches described herein. As such, the embodiments described herein go beyond mere execution of the conventional approach in a cloud computing environment, but rather relate to specific embodiments that provide a unique architecture and methodology for more efficient computational resource allocation to produce cost-effective geospatial mosaic images.

Figure 2:
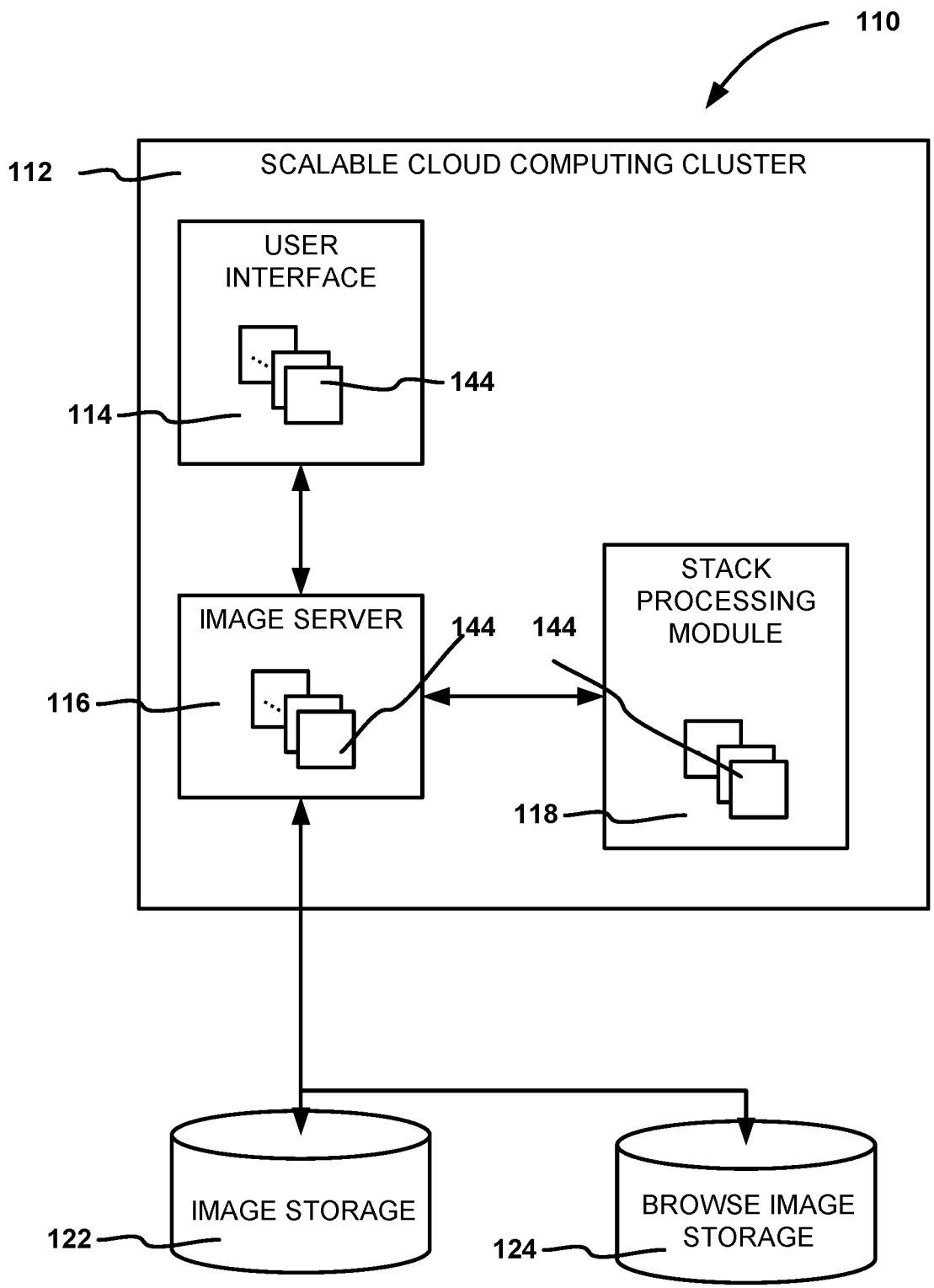
FIG. 2 depicts an embodiment of a front-end image processing module of a mosaic engine.

With further reference to FIG. 2, the front-end image processing module 110 may include a plurality of modules that may be executed in a scalable cloud computing cluster 112. Specifically, a user interface module 114, a image server 116, and a stack processing module 118 may each be executed in the scalable cloud computing cluster 112.

The scalable cloud computing cluster may include scalable storage and/or scalable processing capacity. For instance, one or more instances or nodes 144 may be created for execution of one or more of the user interface module 114, image server 116, and/or stack processing module 118. Each of the instances or nodes 144 may comprise a virtual machine executed in a cloud computing infrastructure with corresponding computational capacity and/or memory associated with each node 144. The modules may each comprise non-transitory machine-readable instructions or code. The non-transitory machine-readable instructions may be containerized or included in a code interoperability wrapper to allow for execution by any computational platform or operating system. Each node 144 may have dedicated computational resources assigned there with that are associated with the virtual machine or instance of the node for use in processing data at the node. Each node 144 may also include persistent memory, which may be provided in any number of forms including as associated physical memory, a block device, object storage, a relational database, or other appropriate memory type. The machine-readable instructions may be stored or loaded into such persistent memory for execution of the modules at a node 144. In one preferential embodiment, a node 144 may be in operative communication with an elastic object cloud storage comprising a scalable memory resource in the cloud computing infrastructure (e.g., to access on instances of geospatial imagery store in the elastic object cloud storage).

The number of nodes 144 provided for execution of each of the modules in the scalable cloud computing cluster 112 may be flexible and vary based upon computational demand associated with the operation of each of the modules. Moreover, as each of the nodes 144 may have associated memory there with, files used in the processing of data at each module may be communicated to a node 144, which in turn stores an instance of the file in the associated dedicated memory resource of the node 144 for processing the data associated with the file. In the context of processing digital geospatial imagery files, more than one node 144 and/or more than one module of the scalable cloud computer cluster 112 may process a given instance of a digital image file concurrently or in parallel by maintaining an instance of the file in the associated dedicated memory resource for the node 144 or by accessing an instance of the image from an elastic object cloud storage instance. As will be appreciated in the discussion to follow, execution of the modules in the scalable cloud computing cluster 112 may provide benefits in connection with processing strips into tiles, as such an approach provides a more granular computing approach that may be more efficiently distributed across the scalable nodes 144 of the scalable cloud computing cluster 112.

In any regard, the user interface module 114 may be operative to generate a user interface that allows a user to interact with the mosaic engine 100. Specifically, the user interface module 114 may comprise a web service that is operative to generate a web-based user interface that allows for interaction by a user to generate a mosaic recipe for an area of interest. To facilitate such interaction, the web-based user interface may include a map display as described in greater detail below. The map display may present to the user geospatial imagery to allow for selection of geospatial imagery for inclusion in the mosaic recipe.

In turn, the user interface module 114 may allow for a user to define an area of interest for which a mosaic 130 is desired. The area of interest may be defined by selection of an area in the map display of the user interface or in other manners other than selection in relation to a map such as by manual input of latitudinal/longitudinal coordinate bounds, area descriptions (e.g., continent names, country names, town names, or the like), or other appropriate means for defining an area of interest. Another function of the map display may be to present to a user information and/or representations of available geospatial imagery that is available for a given area of interest. For instance, one or more geospatial images may be stored in image storage 122. The image storage 122 may include a database of available geospatial imagery, which may be referred to as an image catalog that may include reference to metadata information regarding the geospatial images contained in the image storage 122. For instance, the image storage 122 may comprise a relational database structure, which as described in greater detail below may employ a geospatially specific object-relational database management system that defines a geospatial image file format for efficient processing of digital geospatial image files.

In view of the potential large size of geospatial images in the image store 122 and considering that an area of interest may extend to very large geographical extents (e.g., continent level coverage), it will be appreciated that display of high resolution geospatial images in the map display of the user interface may be impractical or impossible in view of computing limitations. For instance, generating rendered representations in the map display of original, high resolution geospatial images may require vast processing to represent map manipulation operations such as panning the map display, zooming in or out of the map display, removing images from the map display, adding images to the map display, changing a stack order of images, or otherwise editing images of the map display. For instance, significant lag may be present in the user interface if attempting to utilize high-resolution geospatial imagery in the map display in relation to changing zoom levels, panning, modification of imagery, or the like. This lag or other inability to efficiently process such original, high resolution images may degrade the user experience to a point of infeasibility.

Accordingly, the front-end image processing module 110 may employ a stack processing module 118 to generate representational images of the geospatial images in the image store 122 that may be presented to the user in the map display. Such representation images may be low resolution versions corresponding to the original, high resolution geospatial images stored in the image storage 122. The low-resolution versions may be referred to herein as browse version images. The browse version images may be used to render representative images to the user in the map display. Such browse version images may allow for efficient processing to allow for panning, zooming, or other manipulations of the map display. In addition, in relation to facilitating efficient modification of a zoom level of the map display, the stack processing module 118 may generate a plurality of zoom level instances of the browse version images to define an image stack. The image stack may be utilized such that upon zooming in or out of the map display, a different corresponding zoom level instance in the image stack may be retrieved for presentation in the map display. The image stack comprising a plurality of zoom levels of the browse version images may be stored in a browse image storage 124, which may comprise elastic object cloud storage.

A image server 116 may be provided to facilitate communication of image data between the various modules. For instance, the image server 116 may be operative to retrieve one or more geospatial images from the image storage 122 and communicate the geospatial images to the stack processing module 118. In turn, stack processing module 118 may be operative to generate an image stack based on the one or more geospatial images retrieved from the image storage 122 that may include low resolution browse version images of the high-resolution geospatial images retrieved from the image storage 122. The image server 116 may in turn communicate geospatial images to the stack processing module 118 and communication of the image stack from the stack processing module 118. In addition, the image server 116 may retrieve browse version images from the browse image storage 124 for delivery to the user interface module 114.

Specifically, the image server 116 may facilitate communication between modules executed in the scalable cloud computing cluster 112. For instance, rather than in traditional computing paradigms in which application programming interfaces (APIs) local to a given computational device may be utilized to execute applications locally on a computer, execution of modules by way of nodes 144 in the scalable cloud computing cluster 112 may rely on Internet protocol messaging (e.g., HTTP messages) between the various nodes 144 and/or modules for execution. Accordingly, the image server 116 may utilize specific geospatially related protocols and/or libraries for reading and writing geospatial image data in a file format corresponding to geographic data that may be geospatially indexed relative to the surface of the Earth.

For instance, as described above, image storage 122 may comprise a relational database in which the geospatial images are stored. In one embodiment, the image storage 122 may comprise an object relational database management system that may include extensions or other tools to tailor the relational database storage for use with a geographic information system (GIS). For example, the geospatial images may be stored in a specific file format particular to GIS systems such as, for example, the GeoTIFF file format. In any regard, the GIS file format employed in the image storage 122 and accessible by the image server 116 may be particularly suited for retrieval and storage in cloud computing environments in which communication between various components is executed using Internet protocol messaging rather than traditional localized API formats employed when modules are executed locally on a given computing device. For instance, such a cloud optimized file format may allow for a retrieval request (e.g., an HTTP request) to reference a given geospatial imagery file in a particularly localized portion of the file rather than requiring retrieval of the entirety of the file. For instance, the geospatial imagery file may be stored with an internal tile structure applied to the digital image file. In turn, a retrieval request to access the file may include a definition of a content range relative to the internal tile structure of the geospatial image file such that only the portions of the image file corresponding to a portion of the image requested in the retrieval request (e.g., relative to a geographic descriptor) may be accessed in relation to the request. In turn, requests for imagery utilizing the cloud optimized geospatial file format may enable random-access to the pixels within the image without requiring processing of all data of the geospatial image in relation to such a request. As may be appreciated, this may significantly reduce the bandwidth required for retrieval and communication of images amongst the modules and/or nodes 144 of the scalable cloud computing cluster 112.

In any regard, the user interface module 114 may be operative to populate the map display with browse version images retrieved from the browse image storage 124 corresponding to a given zoom level from the image stack that is generated by the stack processing module 118. In turn, the map display provided by the user interface module 114 may utilize low resolution imagery corresponding to the browse version images to help facilitate improved user experience in relation to speed of display of the geospatial images in the map display. The utilization of the browse version images may significantly reduce computational resources that are required in relation to execution of the map display. In this regard, user may be operative to pan, zoom, or otherwise modify the browse version images corresponding to the high-resolution geospatial images with improved user interface performance. In addition, as the image stack may include browse version images corresponding to the geospatial imagery at a plurality of zoom levels, zooming in the user interface may also experience increased performance with little to no lag.

Accordingly, the user interface module 114 may display the map display to the user to allow the user to select one or more geospatial images for inclusion in the mosaic recipe. As may be appreciated, execution of the image server 116 and stack processing module 118 may assist in facilitating an improved user interface experience to provide high-performance in relation to display, selection, and editing of geospatial images in the map display. Furthermore, changes made to selected geospatial images in the map display may be communicated to the stack processing module 118 and used to update the image stack such that any change is propagated throughout the level of the image stack. In turn, upon making a change in the geospatial images in the map display, the change may be reflected throughout the levels of the image stack such that the change is reflected very quickly for representation in the map display.

In one embodiment, the high resolution geospatial imagery may be provided at resolutions of at least about 50 cm, with some embodiments including imager at as high as 30 cm resolution. That is, each pixel in a geospatial image may correspond to no greater than a 50 cm by 50 cm area of the Earth's surface. As can be appreciated, this is a very high-resolution image such that geospatial images and related geospatial mosaics 130 provided at this resolution may be very large digital image files to be stored in memory and communicated using Internet protocols. Accordingly, in one embodiment of the browse version images may provide browse version images corresponding to the geospatial imagery at a resolution of no greater than 16 m resolution. That is, the original, high resolution imagery may be represented at the lower resolution in which each pixel corresponds to a 16 m by 16 m area of the surface of the Earth. In this regard, the browse version images may represent significantly smaller digital image files that allow for increased efficiency when processing the images in the map view of the graphical user interface.

Figure 5:
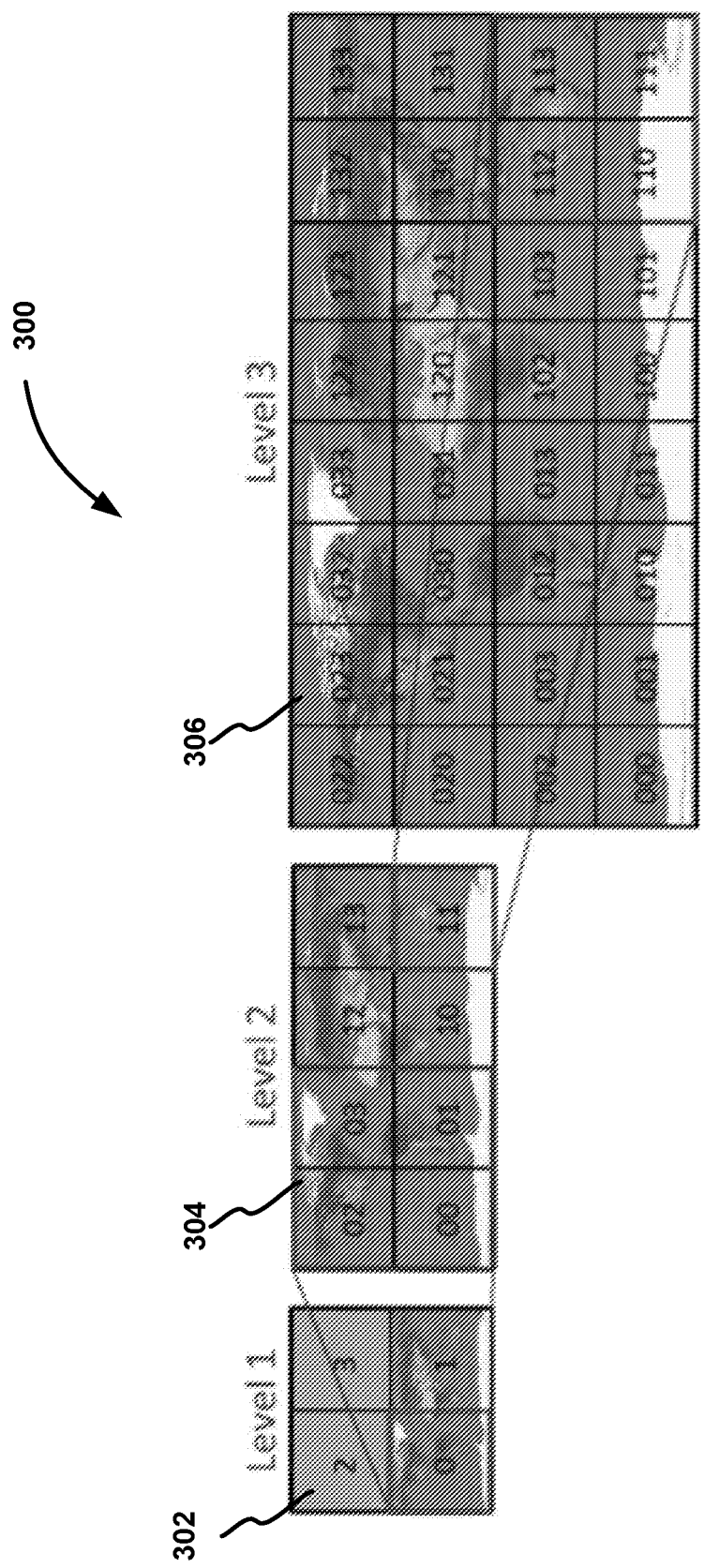
FIG. 5 depicts an embodiment of a tiling scheme that may be used to divide an area of interest into geographically indexed tiles.

As described above, the area of interest may correspond to a given geographic area for which the user desires to create a mosaic. Upon selection of the area of interest, the image server 116 may select geospatial images from the image store 122 having a corresponding geographic extent to the area of interest for retrieval of such images to produce the image stack by the stack processing module 118 for the area of interest. In addition, the area of interest may be divided into a plurality of geographically indexed tiles. While any appropriate tiling schema may be employed, a preferential embodiment may correspond to a quad key indexing scheme as illustrated in FIG. 5. In turn, the user may select geospatial imagery in relation to each of the geographically indexed tiles for inclusion in the mosaic recipe to be generated for the area of interest to produce a mosaic image 130 for the area of interest. In this embodiment, a tiling convention 300 may be defined having multiple levels. The first three levels 302, 304, and 306 are shown in FIG. 5 for illustration. At the first level 302, the Earth is divided between two tiles, each receiving a reference 0 or 1. Each of the tiles of the first level 302 are, in turn, divided into four tiles at the second level 304 and the tile reference from the first level 302 is appended with a reference 0, 1, 2, or 3 depending on the quadrant location of the newly created tile at the second level 304. This results in a two-digit reference at the second level 304 (e.g., 00, 02, 10, 13, etc.). At the third level 306, each tile from the second level 304 is further subdivided into four tiles and appended with a further reference 0, 1, 2, or 3 depending on the quadrant location of the newly created tiles at the third level 306. This results in a three-digit reference (e.g., 000, 010, 123, etc.). This level division may be repeated for increasing granular geographically indexed tiles having correspondingly longer references as the geographic extent of each tile becomes smaller. In one embodiment, a tile may correspond to the twelfth layer (level 12) of such a tiling scheme (e.g., with a unique twelve-digit reference for every tile defined for the Earth). Each tile may correspond to a 10 km by 10 km geographic area of the Earth. As such, reference to a geographically indexed tile may refer to a particular 10 km by 10 km area of the Earth with a unique twelve digit referenced tiles at level 12 of the tiling scheme. In addition, certain operations may be performed on a partition level. A partition may refer to a collection of adjacent tiles. In one embodiment, a partition may comprise an eight by eight grid of 64 tiles, which may correspond to an 80 km by 80 km area.

Figure 3:
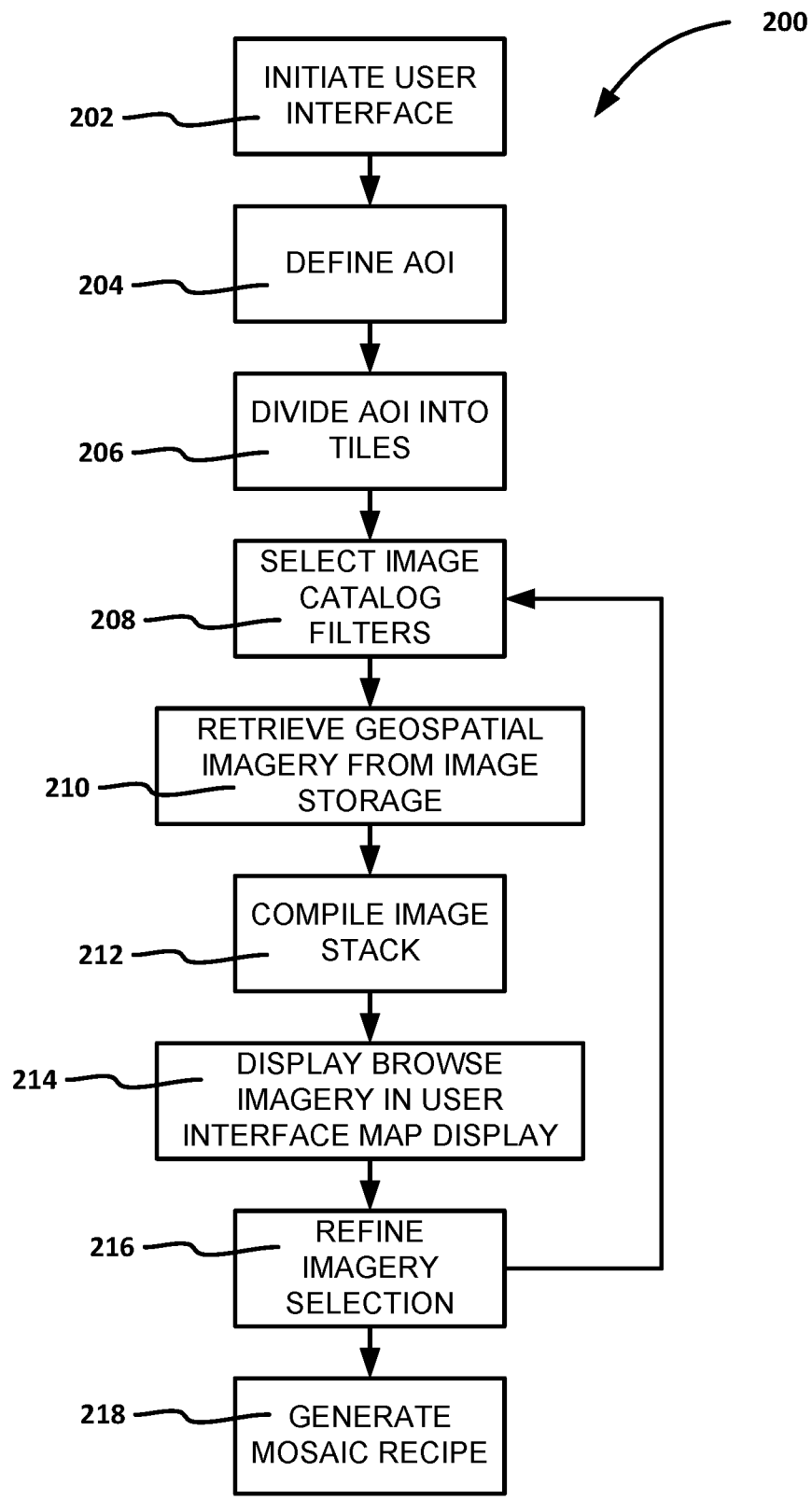
FIG. 3 depicts an embodiment of a method for generation of a mosaic recite at a front-end image processing module.

With further reference to FIG. 3, a method 200 for operation of the front-end image processing module 110 is shown in the form of a flow chart. The method 200 may be performed by the front-end image processing module 110 to generate a mosaic recipe. The method 200 may include initiating 202 the user interface by the user interface module 114. As described above, the initiating 202 may include generation of a web-based user interface that may be accessed by the user using Internet protocol technology to retrieve the web-based user interface from the user interface module 114. The method may further include defining 204 the area of interest for which the user desires a geospatial mosaic 130 to be generated. The method 200 may include dividing 206 the area of interest in the geographically indexed tiles. The tiling scheme employed may include the tiling scheme described in relation to FIG. 5 or other appropriate tiling schemes. In relation to the approach described in FIG. 5, the dividing 206 of the area of interest and tiles may include dividing the area of interest at a given default level of the tiling scheme or at a level as selected by the user interface as appropriate for the geographic extent of the mosaic image 130 to be generated.

The method 200 may further include selecting 208 image catalog filters to be applied to the geospatial images stored in the image store 122 for initial, automated retrieval of relevant geospatial images from the image store 122. For instance, the image catalog filters may include image metadata filters in which selected metadata parameters are provided for initial retrieval of the geospatial imagery from the image storage 122. The cloud optimized geospatial file format referenced above may include such metadata for each geospatial image such that files in the relational database of the image store 122 may be efficiently retrieved based on the image metadata filters chosen as image catalog filters. The selection 208 of the image catalog filters may be by way of user input or may include default filters to retrieve an initial batch geospatial images from the image storage 122 in relation to the automated material selection process. Examples of catalog filters that may be applied in relation to geospatial imagery meta data may include completeness, currency, seasonality, cloud cover, gaps, and strip count, among other possible metadata definitions. In relation to completeness, the primary goal for mosaic assembly is complete coverage relative to the area of interest. That is, there should be no holes in the mosaic recipe. Accordingly, a cloudy or snowy image may be preferably included in a mosaic recipe rather than a hole in relation to the mosaic. In relation to currency, preferably the mosaics should use the most up-to-date imagery possible. In this regard, most recent imagery may be preferred relative to older imagery. In one particular embodiment, preference may be given to imagery from the past two years. However, in cases of extreme defects in the image (e.g., due to seasonality differences, clouds, haze, or the like), older imagery may be preferential to include in a mosaic recipe. In relation to seasonality, the mosaic preferably minimizes seasonal snow to the extent possible. However, persistent snow is acceptable and snowy imagery may be preferred to a gap in the mosaic. Also, in relation to cloud cover, the mosaic should minimize clouds and extreme haze to the extent possible. Large clouds may be unavoidable in certain climate zones, and in such cases, cloudy imagery may be preferred to a gap in the mosaic. In relation to determinations related to cloud cover and/or snow cover in images, comparison of a candidate geospatial image to a base layer image may be used to determine if the geospatial imagery is sufficiently free of clouds, snow, or other defects for use in the mosaic recipe. In relation to gaps, it is preferred that no gaps or lack of images be included in the mosaic recipe. Finally, in relation to strip count, it is preferable to minimize the number of strips included in the mosaic recipe, however image quality considerations described above may dictate an increased number of strips to achieve sufficient quality.

In any regard, the method 200 may include retrieving 210 geospatial imagery from the image storage 122 (e.g., by the image server 116.). The geospatial images retrieved 210 may be of corresponding geographic extent to the area of interest defined at 204. That is, in addition to the image catalog filters selected 208, the image server 116 may only retrieve geospatial imagery from the image store 122 that has at least some geographic overlap with the area of interest. In this regard, geospatial images need not completely overlap the area of interest but may partially overlap the area of interest. Accordingly, the number of geospatial images retrieved at 210 a be somewhat limited by both the image catalog filters selected 208 and by only retrieving geospatial images corresponding to the area of interest 204.

Upon retrieval 210 of the geospatial imagery from the image storage 122, the image server 116 may provide such images to the stack processing module 118. In turn, the method 200 may include compiling 212 an image stack for the retrieved geospatial imagery. Upon compiling 212 the image stack, the browse version images comprising the image stack may be stored in the browse image storage 124. The method 200 may include displaying 214 the browse version imagery retrieved from the browse image storage 124 in the map display of the user interface initiated at 202. As may be appreciated, the images displayed at 214 may correspond to the selected image catalog filters at 208 and to images with geographic extent overlapping the area of interest defined at 204. That is, an initial batch of geospatial imagery may be retrieved 210, compiled 212 into an image stack, and display 214 in the map display of the user interface for review by the user in an automated fashion with minimal or no initial user interaction.

In turn, and as will be described in greater detail below, a user may utilize the user interface to refine 216 imagery that is selected for inclusion in the mosaic recipe by manipulation of the images in the map display. Such manipulation may occur in relation to a limited geographic extent of the area of interest. For instance, such manipulation may occur at a tile level corresponding to the tiles created by the division 206 of the area of interest in the tiles. Alternatively, such manipulation may occur at a partition level where a partition is defined as a collection (e.g., an 8×8 grouping) of tiles. Further still, manipulation may occur in relation to image strips, which may span a plurality of tiles. As will be discussed in greater detail below, the refining 216 of the imagery selection may include a number of operations in relation to the geospatial imagery represented in the map display as browse version images. Such operations may include reordering a stack order of the geospatial imagery by modifying the stack order of images in relation to a foreground and background direction of the map. In addition, geospatial imagery that was retrieved 210 in relation to the automated material selection based on the initially selected 208 image catalog filters may be modified. That is, the method 200 may be iterative such that new selections 208 of image catalog filters may be provided for review of or selection of alternative geospatial images from the image store 122. In turn, the newly selected images may be retrieved 210 the imagery storage 122 and compiled 212 into the image stack for display 214 of browse version imagery in the user interface map display. Specifically, the method 200 may iterate in this fashion until the user is satisfied with the imagery selected and displayed in the map display correspondent area of interest. Upon finalization of the imagery selection, the selected images may be utilized to generate 218 mosaic recipe for use in generation of the mosaic 130 for the area of interest. Accordingly, the mosaic recipe may include a definition of the identity of geospatial images to be utilized for generation of the mosaic image 130 relative to each geographically indexed tile as well as other information including a stack order of the images. As will be appreciated in greater detail below, this information may be granularized in relation to each of the tiles of the area of interest to allow for parallel processing of individual ones of the geographically indexed tiles.

Figure 6:
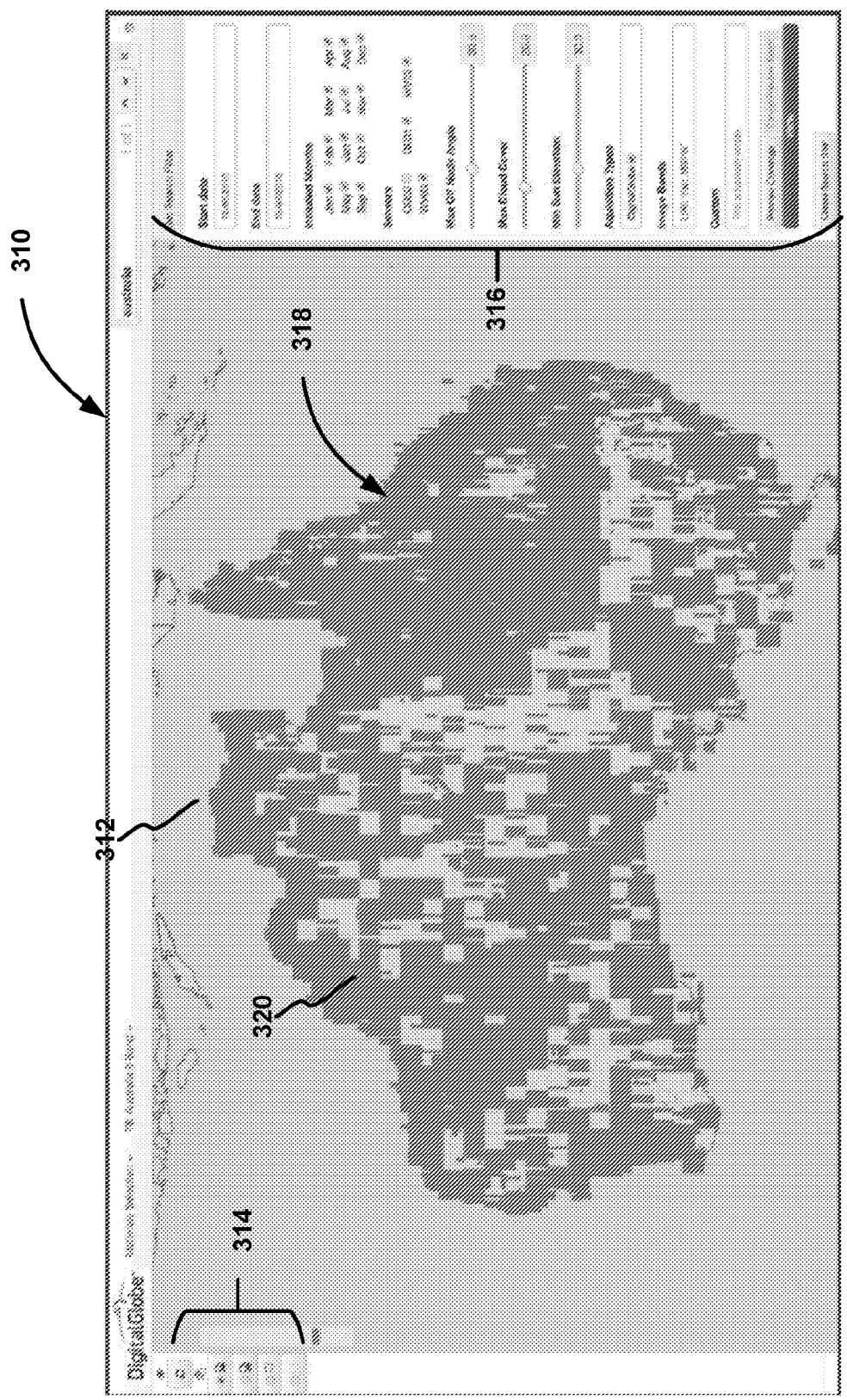
FIG. 6 depicts an embodiment of a user interface for use in review, manipulation, and selection of geospatial imagery for generation of a mosaic recipe.

With further reference to FIG. 6, an embodiment of a web-based user interface 310 is shown. As described above, the user interface 310 may include a map display 312. In the example provided in FIG. 6, the area of interest 318 corresponds to a geographic area corresponding to Australia. The user interface 310 may further include a map control bar 314 and an image catalog filter panel 316. As described above, the image catalog filter panel 316 may allow for a user to select image catalog filters for retrieval of geospatial imagery regarding the area of interest 318. Specifically, the darkened portions 320 shown in the map display 312 correspond geospatial imagery available from the image storage 122 based on the image catalog filters designated using the image catalog filter panel 316. As can be appreciated, the image catalog filter panel 316 may allow for selection of search parameters or filter parameters regarding any image metadata. In this regard, the image catalog filter panel 316 includes a date selection field, an included months selection field, an available sensor selection field, a maximum off nadir angle selection, a maximum cloud cover selection, a minimum sun elevation selection, an acquisition type selection, an image band selection, and a custom filter field, all of which may be utilized to catalog filters for use in retrieval of the geospatial images 320.

As can be appreciated from the map display 312 in FIG. 6, the user interface 310 may provide a user quick assessment of the feasibility for producing a mosaic image 130 in relation to the area of interest 318. For instance, the area of interest 318 corresponding to Australia in FIG. 6 demonstrates that there are significant gaps in coverage of available geospatial imagery 320 for use in generation of a mosaic. In this regard, a user would be informed very quickly upon review of the map display 312 at the zoom level shown in FIG. 6 that a geospatial mosaic 130 that covers the entirety of the area of interest 318 may not be possible. However, for a more limited geographic selection, a feasibility indication may be quickly provided where geospatial imagery 320 is available for the entire area of interest 318 selected.

Figure 7:
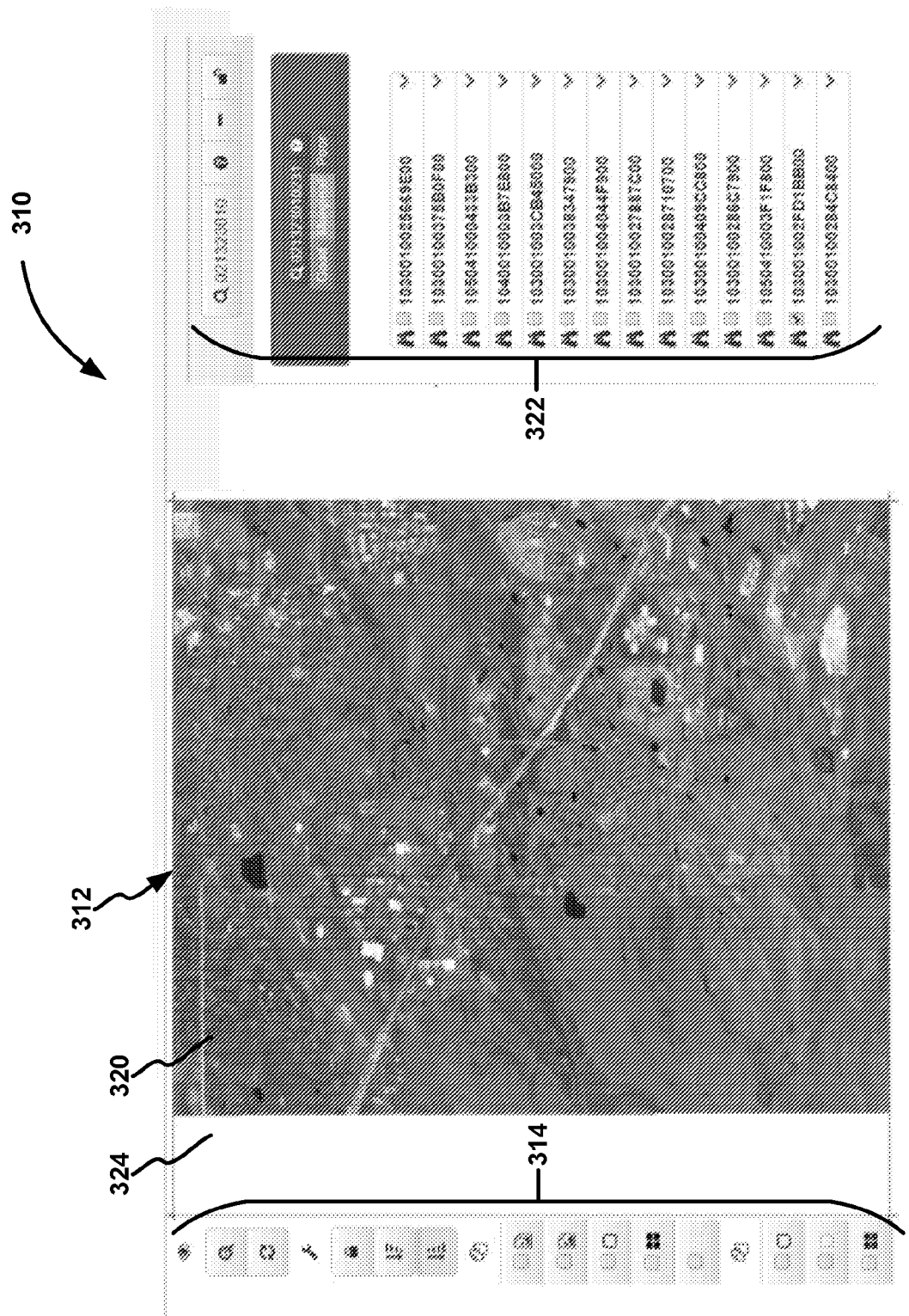
FIGS. 7-9 depict various examples of an embodiment of a user interface that allows for selection from available geospatial images for use in relation to a tile of an area of interest.

With further reference to FIG. 7, the user interface 310 depicts a more limited map display 312 that depicts a given tile for selection of geospatial imagery 320. Selection of the tile may be accomplished by way of the map control bar 314. Upon selection of the tile, the available geospatial imagery in the image catalog of the image store 122 may be presented in an image selection field 322. As can be appreciated in FIG. 7, a gap 324 exists in relation to the tile displayed. In this regard, the listing in the image selection field 322 may correspond to all available geospatial images available for the tile selected and shown in the user interface 310 in FIG. 7. In this regard, a user may be operative to select an additional geospatial image from the image selection field 322 for evaluation of the respective images for inclusion in the mosaic recipe in relation to the tile represented in the user interface 310 to fill the gap 324. In addition, the stack order of the images selected may be defined (e.g., using the map control bar 314).

Figure 4:
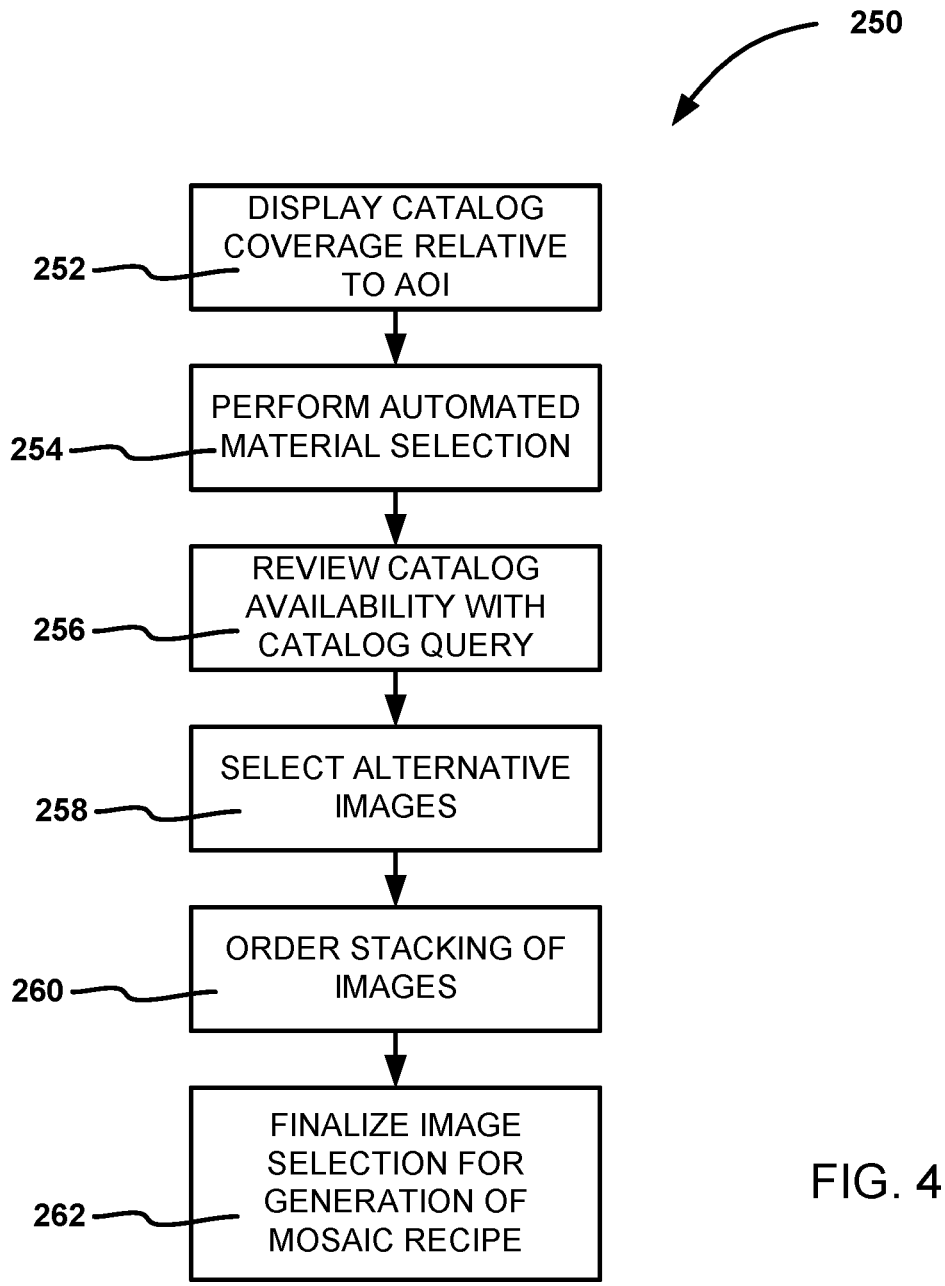
FIG. 4 depicts an embodiment of a method for selection of geospatial imagery for inclusion in a mosaic recipe.

With further reference to FIG. 4, a flowchart of a method 250 depicting an embodiment of a method for refining a mosaic recipe is shown. The method 250 may include displaying 252 catalog coverage relative to the area of interest. This may include a map display 312 as shown in FIG. 6 in which actual imagery or a representation of imagery coverage is presented relative to the area of interest.

The method 250 also includes performing 254 automated material selection. This may include selection of initial catalog filters or may apply default catalog filters to retrieve geospatial imagery that conform to the selected catalog filters.

The method 250 may also allow for reviewing 256 catalog availability with a catalog query. This may include querying the image catalog in relation to images covering all or a portion of a tile, partition, or the like. This may include, but does not require, defining parameters in relation to image metadata. The image results from the catalog query may be presented in the image section field 322. In this regard, a user may be operative to preview images in the map display by selection of one or more of the image results from the catalog query. As such, the method 250 may include selecting 258 alternative images from those returned in the initial, automated material selection. This may include replacement, removal, or addition of geospatial images. In addition, the method may include ordering 260 the stacking of the images by moving certain images to the foreground or to the background in a stack of images. In turn, upon satisfaction by the user, the method 250 may include finalizing 262 the image selection to generate the mosaic recipe.

As shown in the image selection field 322, a selection of "good," "marginal," and "poor" may be provided for filtering of the listing of available geospatial images in the image selection field 322. The good, marginal, and poor designators may be based on rating criteria that may be automatically or manually applied to each geospatial image based on certain parameters. Example parameters for determining the rating criteria include cloud cover, snow coverage, presence of haze, or other quantifiable parameters regarding image quality.

In addition, the user interface 310 may allow for selection of the plurality of tiles and/or a given partition of tiles to allow for previewing coverage of geospatial images in relation to the plurality of tiles selected. That is, the user interface 310 may allow for selection of more than one tile for use as a bounding box to allow for selection of strips that may be applicable to the plurality of selected tiles. This may assist in selection of strips that extend to and provide mosaic coverage for the plurality of the tiles collectively.

Figure 8:
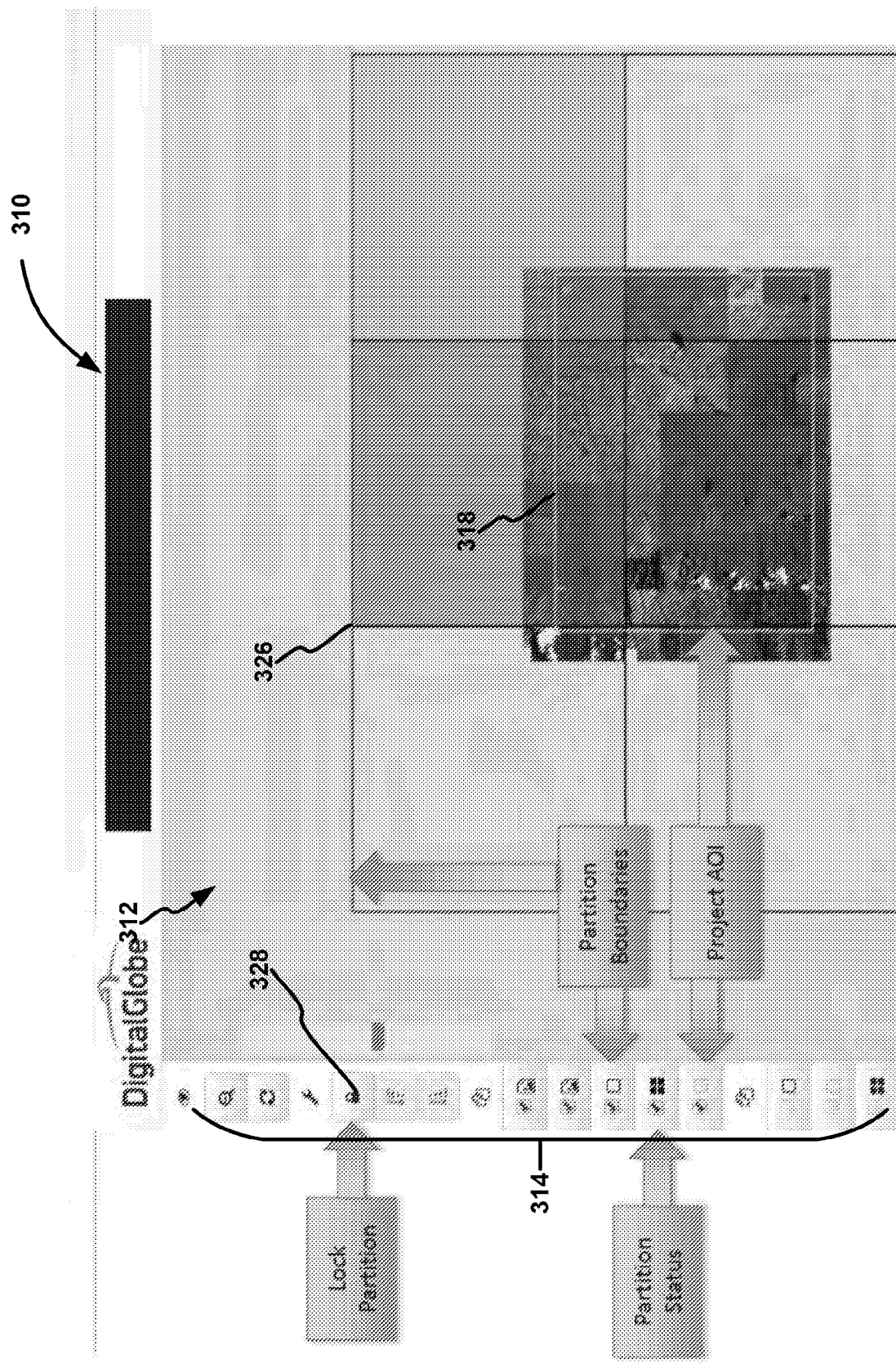
Figure 9:
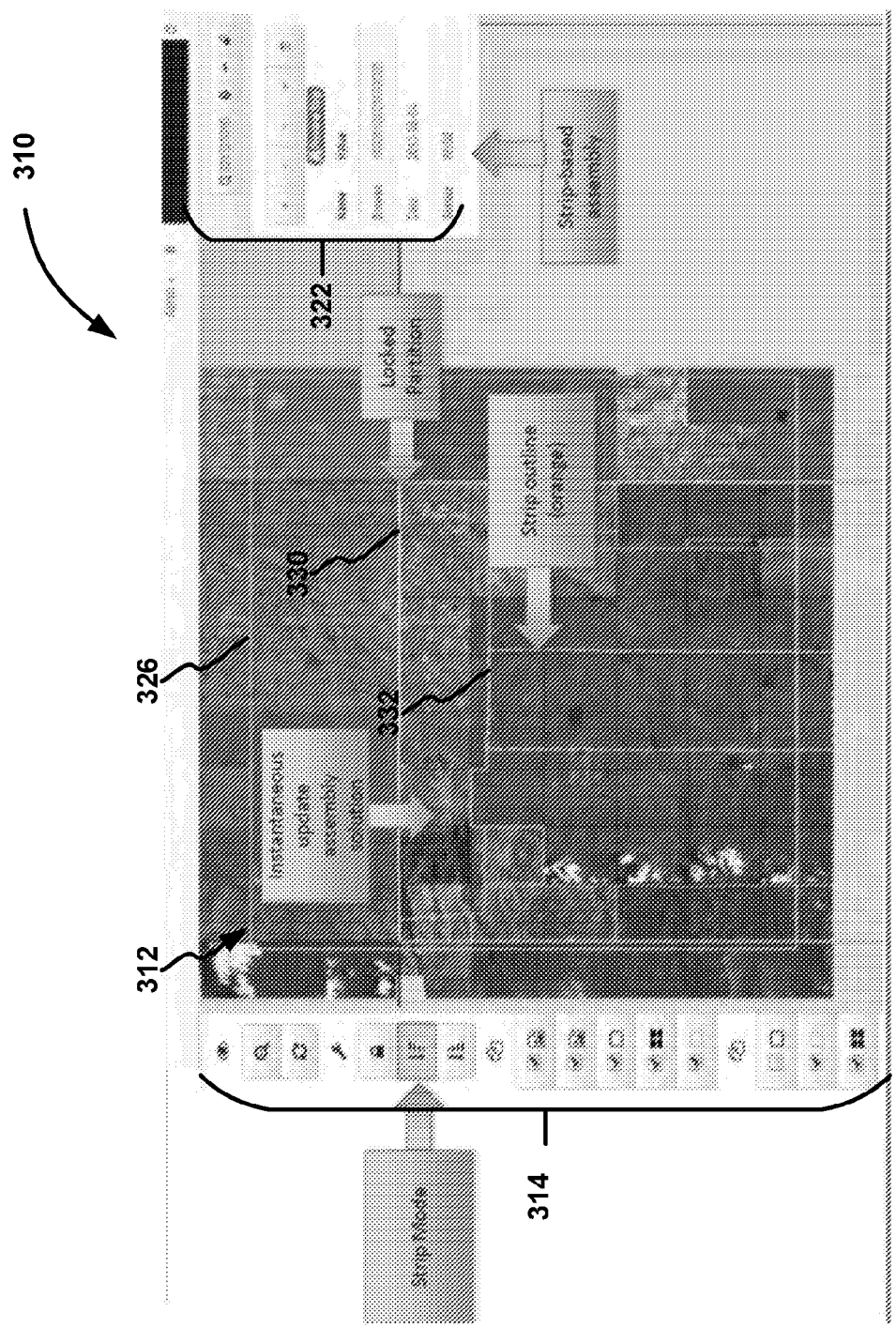

In connection therewith, FIG. 8 details various representations that may be depicted in a map display 312 of the user interface 310. For instance, the area of interest 318 may be shown as a bounded area within the map display 312. Also, partitions 326 may be displayed in the map display 312. Control of the display of such representations or guides may be controlled by selections in the map control bar 314. In addition, selected partitions 326 may be locked by a partition lock selection 328. In this regard, partitions may be locked or otherwise "checked out" by individual users. This may allow multiple users to collectively refine or otherwise manipulate individual partitions within a project area of interest 318. In turn, generation of the mosaic recipe, to the extend it requires human intervention, may conveniently be divided amongst a plurality of users by locking partitions 326 with the partition lock selection 328. For instance, with further reference to FIG. 9, a locked partition 330 is shown in the map display 312. Within the locked partition 330, strip outlines 332 may be highlighted to guide users in relation to strip extents of the currently selected geospatial imagery of the map display 312. In turn, the image selection field 322 may be used to update strips provided for a partition 326.

Furthermore, the front-end image processing module 110 may be operative to access previously generated or the mosaic images 130 from the image storage 122 for processing in the user interface 114. In this regard, the user interface module 114 may handle the previously generated geospatial mosaic image 130 as a single geospatial image or strip for processing in the manner described above in relation to other strips of geospatial imagery data. In this regard, it may be easy for a user to load a previously generated or the mosaic image 130 and review additional and/or updated geospatial imagery that may be utilized to improve or update the previously generated geospatial mosaic image 130. Moreover, as the previously generated geospatial mosaic image 130 may undergo processing by the stack processing module 118 to provide an image stack for presentation in the user interface module 114, even very large geospatial mosaic images 130 may be efficiently rendered in the user interface 114. This may allow for quickly reviewing previously generated or the mosaic images 130 even if such files are quite large to provide efficient update and selection of additional images for inclusion in further iterations of the geospatial mosaic image 130.

Moreover, in view of the processing techniques described above in relation to cloud optimized geospatial file formats, the image server 116 may facilitate the ability to ingest or otherwise process any geospatial imagery provided in an image store 122. In this regard, multiple sources of geospatial imagery data may be provided that are each seamlessly ingested into the front-end image processing module 110 for potential inclusion in a geospatial mosaic image 130 to be created using the mosaic engine 100.

Figure 10:
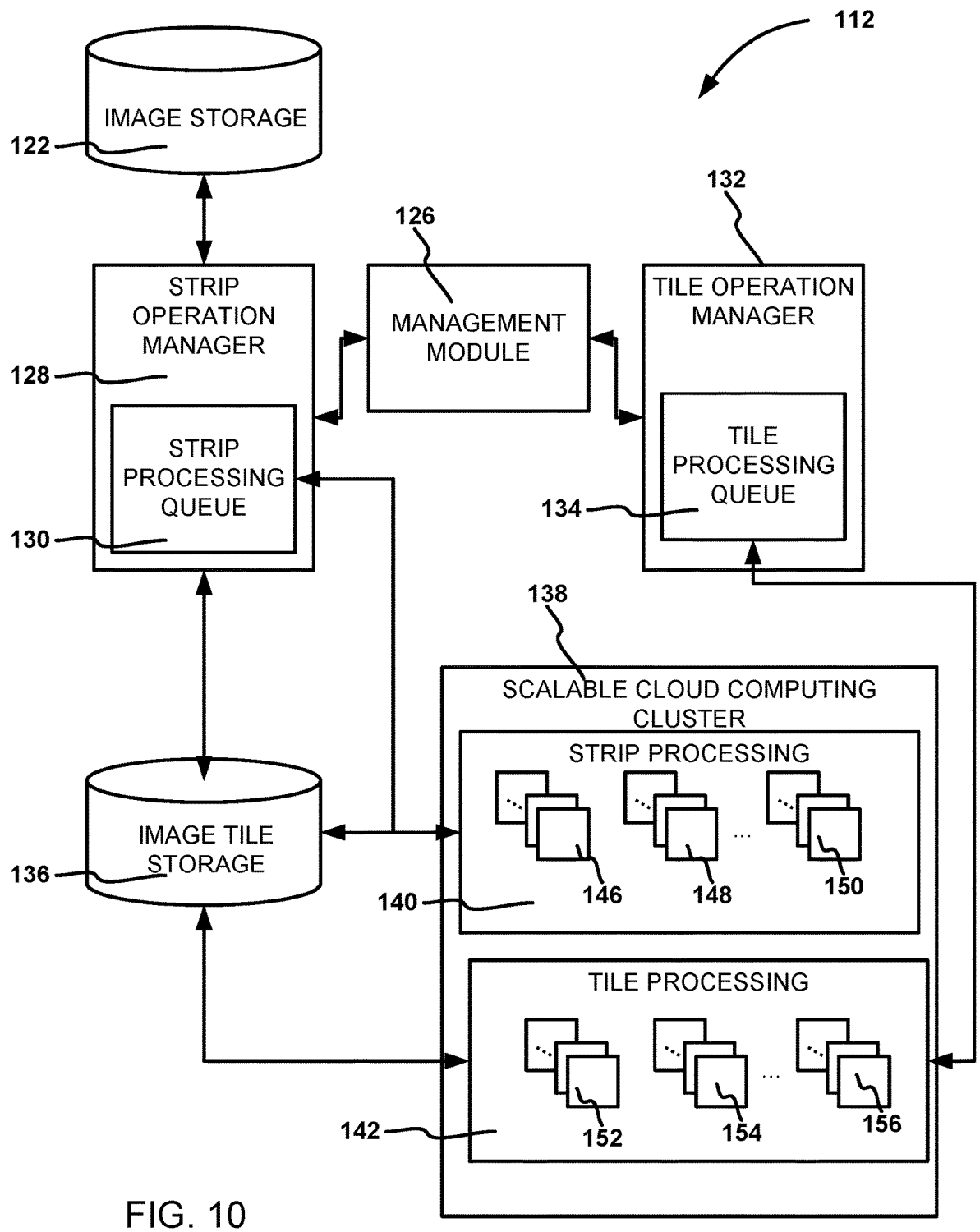
FIG. 10 depicts an embodiment of a back-end image processing module of a mosaic image.

In turn, the mosaic recipe may be provided from the front-end image processing module 110 to the back-end image processing module 120. In turn, the back-end image processing module 120 may execute to generate the geospatial mosaic 130 based on the mosaic recipe received from the front-end image processing module 110. In connection therewith, FIG. 10 provides a more detailed schematic for the back-end image processing module 120.

Specifically, the back-end image processing module 120 may include a management module 126 that receives the mosaic recipe from the front-end image processing module 110. The back-end image processing module 120 also includes a strip operation management module or strip operation manager 128 and a tile operation management module or tile operation manager 132. The back-end image processing module 120 also includes a scalable cloud computing cluster 138. The scalable cloud computing cluster 138 may have a similar capability as that described above in relation to the scalable cloud computing cluster 112 of the front-end image processing module 110. That is, the scalable cloud computing cluster 138 of the back-end image processing module 112 may include scalable computational and memory resources that may be dedicated to various nodes that may comprise virtual machines or other cloud computing instances for execution of certain processes as will be described in greater detail below. Moreover, the management module 126, strip operation manager 128, and tile manager 132 may comprise non-transitory machine readable instructions stored in memory that is accessible by a processor for execution of the modules as described above in relation to the front-end image processing module 110. For instance, like that described above, the machine-readable instructions may be stored in a interoperability wrapper that allows for execution of the modules on any processing hardware using any operating system. As such, the modules described in relation to the back-end image processing module 112 may be executed in a cloud computing environment at one or more nodes or cloud instances that may have dedicated computing and/or memory resources. Furthermore, while not shown, communication of image data between the modules or other components described in relation to the back-end image processing module 112 may utilize an image server that is capable of communicating image data using a geospatial-specific file format as described above. Accordingly, like the description above, the image server may access discrete portions of pixels of an image without requiring retrieval and serving of full image files comprising all the image data. This may be beneficial in view of the fact that the back-end image processing module 112 may be executed in a cloud-computing environment in which communication between modules is over computer networks using Internet protocol messaging. That is, reducing the amount of image data requested and served may improve bandwidth usage in relation to execution of the modules.

The management module 126 may be in operative communication with a strip operation manager 128. Specifically, the management module 126 may communicate the identity of the high-resolution geospatial images to be utilized in connection with generation of the geospatial mosaic 130 based on the mosaic recipe to the strip management module 126. In turn, the strip operation manager may request strips from the image storage 122 corresponding to strips that are included in the mosaic recipe. As strips are received at the strip operation manager 128 from the image storage 122, the strip operation manager 128 may generate a strip processing queue 130. As may be appreciated, as the various strips requested from the image storage 122 may have different sizes, certain images may be retrieved from the image storage 122 more quickly than others. In this regard, strip operation manager 128 may utilize greedy algorithms to initiate processing of the strips as they are received from the image storage 122, e.g., rather than awaiting receipt of all strips from the image storage 122.

The scalable cloud computing cluster 138 may include a strip processing portion 140. Specifically, the strip processing portion 140 may initiate a number of cloud computing instances or nodes upon generation of the strip processing queue 130 for processing of the strip images (e.g., for performing strip-level jobs). As shown in FIG. 10, a number of different nodes 146, 148, and 150 may be generated in the strip processing portion 140 of the scalable cloud computing cluster 138 for performing strip-level jobs. For instance, one or more image correction processing nodes 146 may be provided, one or more dynamic range adjustment processing nodes 148 may be provided, and/or one or more tiling nodes 150 may be provided.

The image correction processing nodes 146 may perform a number of tasks in relation to strips in response to strip level jobs being queued in the strip processing queue 130 upon retrieval of strips from the image storage 122. For instance, the image correction processing nodes 146 may perform orthorectification, atmospheric compensation, pan sharpening, or any other appropriate image correction technique applied to geospatial imagery. Furthermore, the dynamic range adjustment processing nodes 148 may perform dynamic range adjustment processing of the strips. For instance, one approach to dynamic range adjustment the may be employed is described in U.S. Pat. Pub. No. 2006/0126959, which is incorporated by reference herein in its entirety. In addition, the tiling nodes 150 may divide the strips into image tiles of corresponding extent to the geographically index tiles of the area of interest as described above. In relation to the processing by each of the node types of the strip processing portion 140, scalable cloud object storage may be provided for storage of the strips in various stages of processing by the nodes. That is, the strip operation manager 128 may order geospatial images from the image storage 122. Instances of the geospatial images may be stored in the scalable cloud object storage that are accessible by the processing nodes of the strip processing portion 140. In this regard, the strip processing may be applied on the instances in the elastic cloud object storage, which may be expanded based on the load in view of the available strips that have been retrieved from the image storage 122. Once processing has been complete to include dividing the strips into image tiles, the image tiles from the strips may be stored in an image tile storage 136. In addition, the strip operation manager 128 may be informed that the strips have been processed. The strip operation manager 128 may in turn inform the manager module 126 of the availability of image tiles for the processed strips in the image tile storage 136.

In relation to the processing of the strips by the strip processing portion 140, the strip operation manager 128 may populate the strip processing queue 130 with available strip level jobs based on the geospatial imagery that has been retrieved from image storage 122. The execution of the processing by the image correction processing nodes 146, dynamic range adjustment processing nodes 148, and tiling nodes 150 may be managed according to a directed acyclic graph (DAG). In this regard, to the extent possible parallel processing by the nodes of the strip processing portion 140 may occur on various strips received from the image storage 122. This may allow for efficient processing of the strips in the strip processing portion 140 for generation of the image tiles for inclusion in the image tile storage 136. In addition, the number of the various nodes in the strip processing portion 140 of the scalable cloud computing cluster 138 may be determined based upon the number of jobs in the strip processing queue 130. In this regard, as the number of strip-level jobs in the strip processing queue 130 grows, additional nodes may be initiated in the strip processing portion 140 to accommodate an increased job load in the strip processing queue 130.

The management module 126 may inform the tile operation manager 132 of the availability of image tiles in the image tile storage 136 once the strips have been processed into image tiles by the tiling nodes 150. Accordingly, the tile operation manager 132 may determine available tile-level jobs that may be processed based on the availability of image tiles in the image tile storage 136. In turn, A tile processing queue 134 may be generated and a tile processing portion 142 of the scalable cloud computing cluster 112 may generate cloud computational instances or nodes for execution of various ones of the tile-level jobs in the tile processing queue 134. The availability of tile-level jobs in the tile processing queue 134 may be based upon the availability of image tiles in the image tile storage 136. In this regard, as the strip processing portion 140 processes strips into tiles, the tile processing queue 134 may be populated with available tile-level jobs based upon in response to being informed of the availability of the image tiles in the image tile storage 136.

As such, tile processing portion 142 may be provided in the scalable cloud computing cluster 112. In this regard, one or more different types of nodes may be generated in the scalable cloud computing cluster 138 in the tile processing portion 142 for execution of various tile-level jobs. For instance, intra-tile cut line nodes 152, inter-tile cut line nodes 154, and/or blending nodes 156 may be provided to perform corresponding intra-tile cut line generation, inter-tile cut line generation, and blending operations as will be described in greater detail below.

In turn, as tile-level jobs are populated in the tile processing queue 134, various ones of the nodes 152-156 described above may be generated in the tile processing portion 142. In addition, the tile processing portion 142 may retrieve image tiles from the image tile storage 136 for use in execution of tile-level jobs from the tile processing queue 134. Tile-level jobs may include intra-tile cutline generation, inter-tile cutline generation, and cutline blending. The tile operation manager 132 may populate the tile processing queue 134 with tile jobs using a greedy algorithm that continuously scans the mosaic recipe in view of the available image tiles in the image tile storage 136 as they become available after processing by the strip processing portion 140. In this regard, it may be appreciated that upon an image tile becoming available in the image tile storage 136, a number of different jobs may be created. For example, availability of a given image tile may drive dependent intra-tile jobs that may be completed in parallel in addition to inter-tile jobs that may be completed upon execution of parent jobs for the individual tiles to be completed for the inter-tile processing. In any regard, the population of the tile processing queue 134 may be accomplished in a manner such that each tile-level job that may be completed upon availability of a tile image in the image tile storage 136 may be initiated. In turn, the tile processing portion 142 may perform the tile operations on each tile of the area of interest until the entirety of the geospatial mosaic 130 is available upon completion of all tile-level jobs the tile processing queue 134 as described in greater detail below. Like the strip-level jobs, the tile-level jobs may be dictated by a directed acyclic graph (DAG) with parallel operation for various tiles to provide a highly scalable solution.

Figure 11:
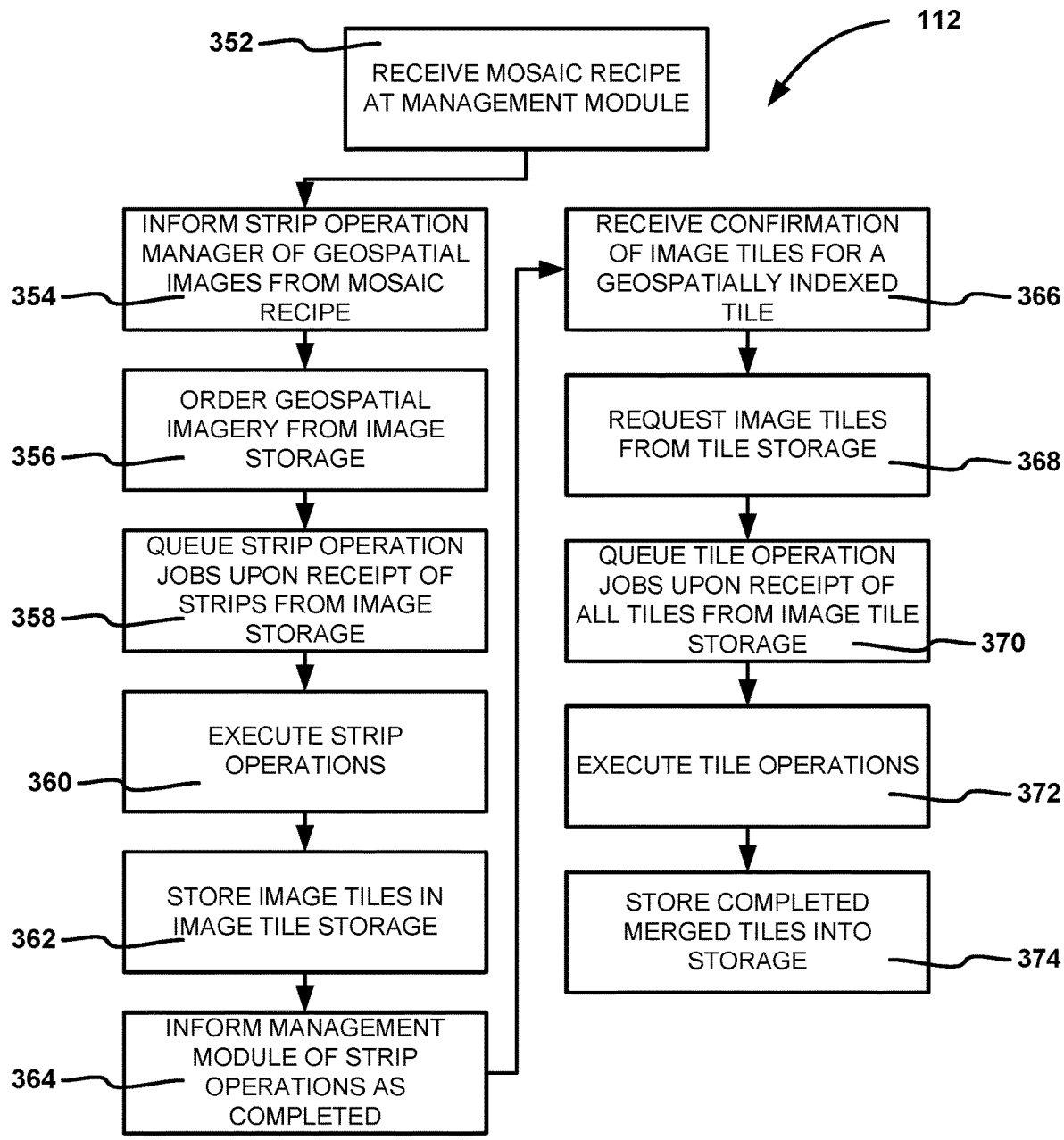
FIG. 11 depicts an embodiment of execution of the back-end image processing module for use in generation of a geospatial mosaic.

FIG. 11 depicts an embodiment of a method 350 for operation of the back-end image processing module 120. The method 350 may include receiving 352 the mosaic recipe at the management module 126. The manager module 126 may inform 354 the strip operation manager 128 of the geospatial images comprising the mosaic recipe. In turn, strip operation manager 128 may order 356 geospatial imagery from the image storage. In turn, the strip operation manager 128 may queue 358 strip-level jobs in the strip processing queue 130 upon receipt of the strips from the image storage 122. In addition, the strip operation manager 128 may store instances of the received geospatial imagery in scalable cloud objects storage for access by the various nodes of the strip processing portion 140. As described above, the method 350 may include executing 360 strip-level jobs by the strip processing portion 140 of the scalable cloud computing cluster 112 to perform strip-level jobs according to the strip processing queue 130. In turn, the method 350 may include storing 362 image tiles in the image tile storage 136. In addition, the strip operation manager 128 may inform 364 the management module 126 as strip-level jobs are completed.

In this regard, the method 350 may include receiving 366 confirmation of the availability of image tiles in the image tile storage 136 at the tile operation manager 132. In turn, the tile operation manager 132 may request 368 image tiles from the tile storage 136. The tile operation manager 132 may store instances of image tiles in scalable cloud objects storage for access by various nodes of the tile processing portion 142. In turn, the tile operation manager 132 may queue 370 tile-level operation jobs upon receipt of all necessary tiles for processing in a given tile from the image tile storage 136. In turn, the method 350 may include executing 372 tile-level jobs operations at the tile processing portion 142. In turn, the tile processing portion 142 may store 374 completed merge tiles into image tile storage 136.

Figure 12:
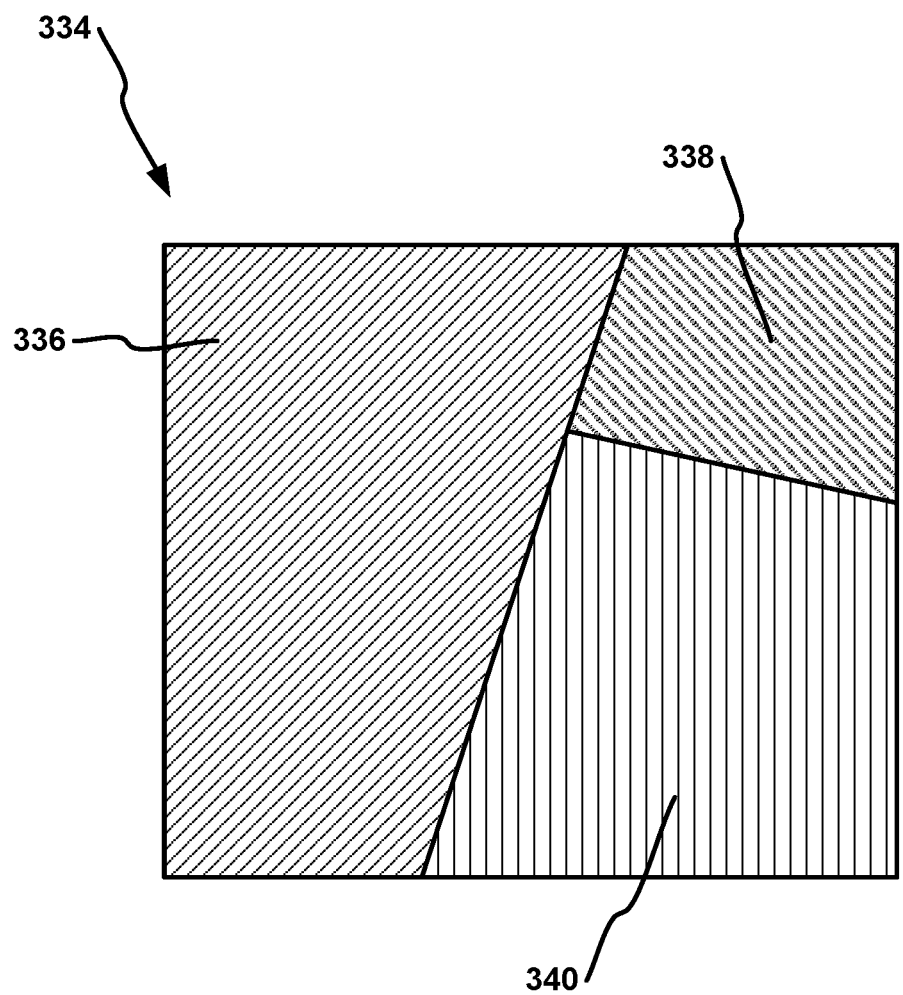

Further reference to FIGS. 12-18, a visual representation of the operation of a DAG is illustrated in relation to various tile-level jobs executed by the tile processing portion 142 of the scalable cloud computing cluster 138. In FIG. 12, a given tile 334 is depicted for which three separate strip portions define the mosaic recipe for the tile 334. That is, a first image portion 336 from a first strip, a second image portion 338 from a second strip, and a third image portion 340 from a third strip define the mosaic recipe for the tile 334. As can be appreciated in FIG. 12, the various image portions 336-340 that are to comprise the tile 334 in the finished geospatial mosaic 130 have straight lines therebetween. This may result in radiometric inconsistencies between the various image portions as the various image portions comprise image tiles from different geospatial images taken at different times or with different collection parameters. In this regard, it may be advantageous to perform intra-tile operations to create a consistent tile image for the tile 334. In addition, the intra-tile operations performed on tile 334 may be executed according to tile-level jobs populated in the tile processing queue 134 based on the availability of the image portions 336-340 in the image tile storage 136. That is, once respective ones of the first image portion 336, second image portion 338, third image portion 340 are available in the image tile storage 136, the tile-level jobs for which the image tile portions are available for the tile 334 may be initiated.

Figure 13:
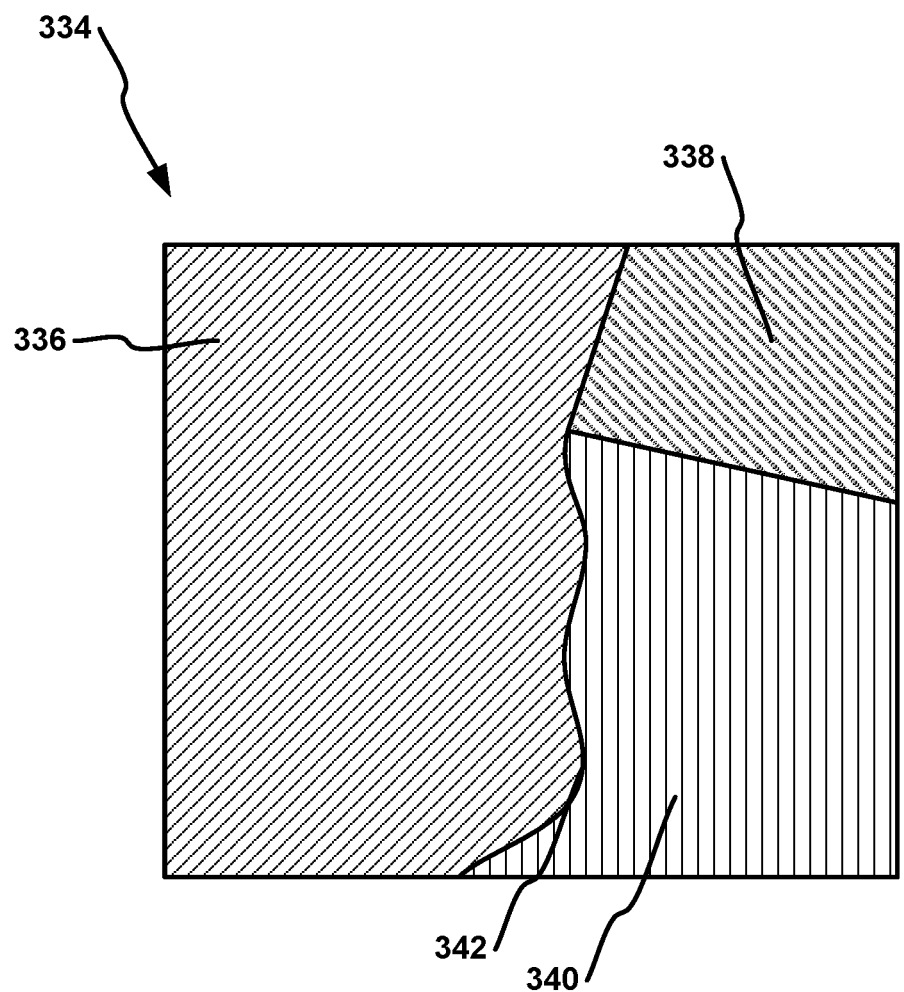

For instance, with further reference to FIG. 13, the first image portion 336 and the third image portion 340 may become available in the image tile storage 136 after strip processing of the strips from which the first image portion 336 and the third image portion 340 are taken. Upon the availability of the first image portion 336 and the third image portion 340, and intra-tile cutline generation process may be performed to generate a cutline 342 between the first image portion 336 and the third image portion 340. The cutline 342 may be generated any appropriate manner to provide a relatively consistent image between the first image portion 336 and the third image portion 340 to avoid inclusion of artifacts or other defects in the image. For example, the cutlines may be generated according to any cutline processing approach including that described in U.S. Pat. No. 9,135,505, the entirety of which is incorporated by reference herein. Other approaches such as application of Dijkstra's algorithm or other approaches now available or hereafter devised may be applied without limitation.

Figure 14:
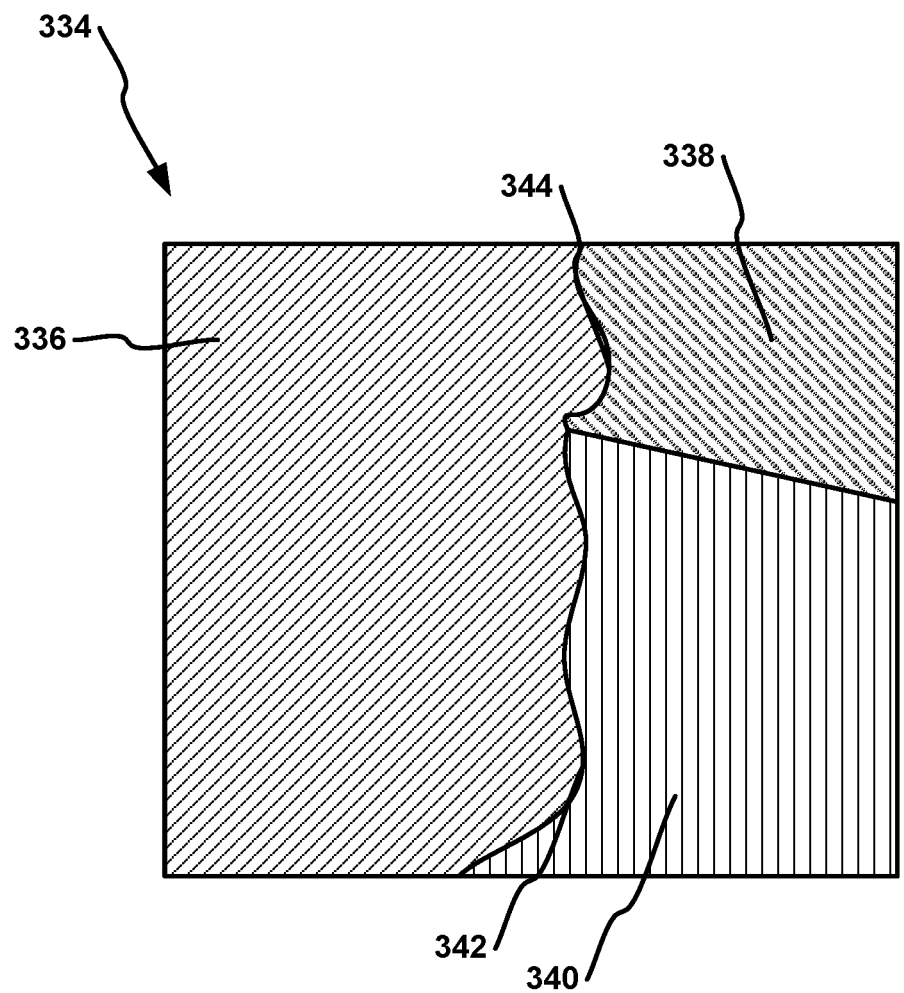
Figure 15:
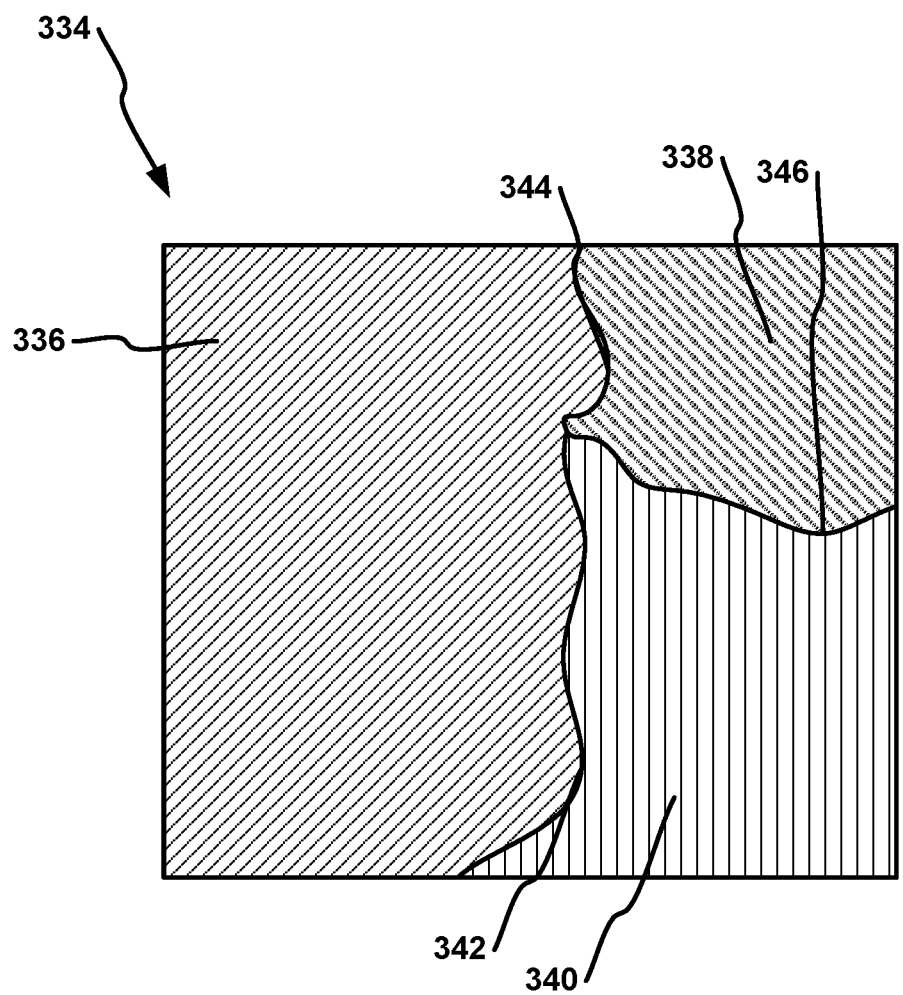

In turn, as shown in FIG. 14 the second image portion 338 may subsequently become available from the image tile storage 136. In this regard, and intra-tile cutline may be generated between the first image portion 336 the second image portion 338 to generate cutline 344. In addition, as shown in FIG. 15, cutline 346 between the second image portion 338 and the third image portion 340 may be generated upon availability a second image portion 338. In addition to the foregoing intra-tile cutlines being generated, cutline blending may also be performed between the various image portions as the cutlines are generated. In turn, the tile 334 is depicted in FIG. 15 may represent a tile in which all intra-tile jobs have been completed. Moreover, it may be appreciated that one or more of the tile-level jobs described above may be performed in parallel with access to instances of the image tiles processed in scalable cloud object storage.

In turn, the tile operation manager 132 may be informed of the completion of the intra-tile jobs in relation to tile 334 such that inter-tile jobs related to tile 334 may be queued in the tile processing queue 134. For instance, with further reference to FIG. 16, the tile 334 may be positioned relative to an adjacent tile 348. As can be appreciated, the adjacent tile 348 consists of a single image tile corresponding to the first image 336 in common with the image portion 336 in the tile 334. In this regard, upon completion of intra-tile jobs for both the first tile 334 and the adjacent tile 348, inter-tile cutlines may be queued in the tile processing queue 134. For example, with further reference to FIG. 17, inter-tile cutline 350 may be generated between the second image portion 338 and the first image portion 336. Additionally, with further reference to FIG. 18, inter-tile cutline 352 may be generated between the third image portion 340 in the first image portion 336 of the adjacent tile 348. In addition, blending may be achieved across the inter-tile cutline 350 and 352. This type of processing may be completed for all intra-tile and inter-tile jobs to generate the mosaic.

EXAMPLE IMPLEMENTATION COMBINATIONS

Some other contemplated embodiments of implementation combinations for various aspects of this disclosure, with or without additional features as disclosed above or elsewhere herein, are summarized in the exemplary numbered combinations presented below:

1. A method for generating a geospatial mosaic image from a plurality of geospatial images, comprising:
   executing a front-end image processing system comprising a user interface to generate a mosaic recipe for an area of interest, comprising:
   defining the area of interest as a selected geographic area, wherein the area of interest is divided into geographically indexed tiles;
   accessing image storage having geospatial images stored therein; retrieving the geospatial images from the image storage corresponding to the area of interest;
   rendering browse version images of at least a portion of the geospatial images from the image storage in a map display of the user interface, wherein the browse version images comprise low resolution image versions of corresponding geospatial images in the image storage; and
   receiving a selection of one or more geospatial images for each geographically indexed tile based on the browse version images to define a mosaic recipe of the geospatial images for use in generation of an orthomosaic images; and
   executing a back-end image processing system to compile an orthomosaic image based on the mosaic recipe, comprising:
   retrieving the geospatial images corresponding to the mosaic recipe from a full resolution image storage and storing the geospatial images in scalable cloud storage;
   processing the geospatial images as the geospatial images are received at the scalable cloud storage using an image strip processor, the processing at least comprising dividing the geospatial images into image tiles of corresponding geographic relation to the geographically indexed tiles and storing the image tiles in scalable cloud storage;
   determining, in response to storing of the image tiles for each said geospatial image, available tile-level operations capable of being performed for each geographically indexed tile based availability of said image tiles corresponding to the mosaic recipe for a given geographically indexed tile;
   generating a queue of operations comprising the available tile-level operations to be performed relative to the image tiles; and
   executing the queue of operations using a scalable cloud computing cluster with parallel operation execution at a plurality of compute nodes of the scalable cloud computing cluster for non-dependent tile-based operations to generate the mosaic.

2. The method of example combination 1, further comprising:
   automatically populating the area of interest with browse version images corresponding to said geospatial images in the map display of the user interface based on metadata information regarding the geospatial images corresponding to the area of interest.

3. The method of any one of example combinations 1 or 2, further comprising:
   searching the image store of geospatial images based on metadata information;
   presenting geospatial image search results comprising browse version images to the user in the map display, wherein the selection includes a said geospatial image of the geospatial image search results.

4. The method of any one of example combinations 1-3, further comprising:
   creating an image stack of the browse version images comprising a plurality of zoom levels of the map display.

5. The method of any one of example combinations 1-4, wherein a change to the selection of the one or more geospatial images is reflected in the image stack at the plurality of zoom levels.

6. The method of any one of example combinations 1-5, wherein the geospatial images from the image store comprise a previously generated geospatial mosaic.

7. The method of any one of example combinations 1-6, wherein the processing further includes the image strip processor applying dynamic range adjustment to the geospatial images.

8. The method of any one of example combinations 1-7, wherein the processing further includes the image strip processor performing at least one of orthorectification, atmospheric compensation, or pan sharpening on the geospatial images.

9. The method of any one of example combinations 1-8, wherein the tile-level operations comprise intra-tile cutline generation, inter-tile cutline generation, and cutline blending.

10. The method of any one of example combinations 1-10, wherein the processing of the geospatial images using the image strip processor is governed by a directed acyclic graph (DAG).

11. The method of any one of example combinations 1-10, wherein the processing of the geospatial images comprise performing strip-level operations in relation to the temporal order in which the geospatial images are received at the scalable cloud storage with parallel operations performed according to the DAG.

12. The method of any one of example combinations 1-11, wherein the tile-level operations are governed by a directed acyclic graph (DAG) comprising parent operations and dependent child operations, wherein the parallel operation execution is according to the DAG.

13. The method of any one of example combinations 1-12, wherein the number of compute nodes used in said executing the queue of operations is based on a number of operations in the queue.

14. A system for generation of a geospatial mosaic image from a plurality of geospatial images, comprising:
- a front-end image processing system portion, comprising:
- an image server executed in a scalable cloud computing cluster to request and serve geospatial images between network locations including requesting high resolution geospatial images from image storage;
- a stack processing module operative to receive the high resolution geospatial images from the image server and generate an image stack comprising low resolution browse version images corresponding to the high resolution geospatial images and to store the browse version images in a scalable cloud storage environment; and
- a user interface module operative to generate a web-based interface comprising a map display of an area of interest that is divided into geographically indexed tiles, the map display including said browse version images of corresponding geographical relation to the area of interest, the user interface module also operative to generate a mosaic recipe of said high resolution geospatial images for use in generation of a geospatial mosaic based on a selection of the browse version images displayed, the mosaic recipe defining the high resolution geospatial images for each geographically indexed tile to be used in generation of the geospatial mosaic;
- a back-end image processing system portion, comprising:
- a management module operative to receive the mosaic recipe from the front-end image processing system;
- a strip operation management module operative to request high resolution geospatial imagery at the direction of the management module and generate a strip processing queue for strip-level jobs to be performed relative to the high resolution geospatial imagery at least including dividing the geospatial images into image tiles of corresponding geographic relation to the geographically indexed tiles;
- a tile operation management module operative to generate a tile processing queue for tile-level jobs to be performed relative to the image tiles at the direction of the management module, wherein the queue includes parallel operation of non-dependent tile-level jobs; and
- a scalable cloud computing cluster operative to dedicate computing nodes for execution of said strip-level jobs and said tile-level jobs, said computing nodes operative to perform said strip-level jobs including the dividing of the geospatial images into tiles and to perform said tile-level jobs.

15. The system of example combination 14, wherein the user interface module is operative to automatically populate the area of interest of the map display with browse version images based on metadata information regarding the geospatial images corresponding to the area of interest.

16. The system of any one of example combinations 14-15, wherein the image storage is searchable by the user interface module to define alternative browse version images for at least a portion of the area of interest.

17. The system of any one of example combinations 14-16, wherein the image stack comprises a plurality of zoom levels of the map display.

18. The system of any one of example combinations 14-17, wherein the stack processing module is operative to propagate a change in the selection of the brose version images through all of the zoom levels of the image stack.

19. The system of any one of example combinations 14-18, wherein the high resolution geospatial images comprise at least one previously generated geospatial mosaic.

20. The system of any one of example combinations 14-19, wherein the strip-level jobs include applying dynamic range adjustment to the high resolution geospatial imagery.

21. The system of any one of example combinations 14-20, wherein the strip-level jobs include orthorectification, atmospheric compensation, and pan sharpening on the high resolution geospatial images.

22. The system of any one of example combinations 14-21, wherein the tile-level jobs include intra-tile cutline generation, inter-tile cutline generation, and cutline blending.

23. The system of any one of example combinations 14-22, wherein the strip operation management module is operative to generate a directed acyclic graph (DAG) comprising parent strip operations and dependent child strip operations and the strip processing queue is based on the strip-level jobs capable of being performed using the geospatial images as retrieved from the image storage.

24. The system of any one of example combinations 14-23, wherein the tile operation management module is operative to generate a directed acyclic graph (DAG) comprising parent tile operations and dependent child tile operations and the tile processing queue is based on tile-level jobs capable of being performed using the image tiles as processed by the scalable cloud computing cluster.

25. A method for generating a geospatial mosaic image from a plurality of geospatial images according to a mosaic recipe, comprising:
- retrieving geospatial images corresponding to a mosaic recipe from a full resolution image storage and storing the geospatial images in scalable cloud storage;
- processing the geospatial images as the geospatial images are received at the scalable cloud storage using an image strip processor, the processing at least comprising dividing the geospatial images into image tiles of corresponding geographic relation to the geographically indexed tiles and storing the image tiles in scalable cloud storage;
- determining, in response to storing of the image tiles for each said geospatial image, available tile-level operations capable of being performed for each geographically indexed tile based availability of said image tiles corresponding to the mosaic recipe for a given geographically indexed tile;
- generating a queue of operations comprising the available tile-level operations to be performed relative to the image tiles; and
- executing the queue of operations using a scalable cloud computing cluster with parallel operation execution at a plurality of compute nodes of the scalable cloud computing cluster for non-dependent tile-based operations to generate a geospatial mosaic.

26. The method of example combination 25, wherein the geospatial images from the image store comprise a previously generated geospatial mosaic.

27. The method of any one of example combinations 25-26, wherein the processing further includes the image strip processor applying dynamic range adjustment to the geospatial images.

28. The method of any one of example combinations 25-27, wherein the processing further includes the image strip processor performing at least one of orthorectification, atmospheric compensation, or pan sharpening on the geospatial images.

29. The method of any one of example combinations 25-28, wherein the tile-level operations comprise intra-tile cutline generation, inter-tile cutline generation, and cutline blending.

30. The method of any one of example combinations 25-29, wherein the processing of the geospatial images using the image strip processor is governed by a directed acyclic graph (DAG).

31. The method of any one of example combinations 25-30, wherein the processing of the geospatial images comprise performing strip-level operations in relation to the temporal order in which the geospatial images are received at the scalable cloud storage with parallel operations performed according to the DAG.

32. The method of any one of example combinations 25-31, wherein the tile-level operations are governed by a directed acyclic graph (DAG) comprising parent operations and dependent child operations, wherein the parallel operation execution is according to the DAG.

33. The method of any one of example combinations 25-32, wherein the number of compute nodes used in said executing the queue of operations is based on a number of operations in the queue.

34. A system for generation of a geospatial mosaic image from a plurality of geospatial images, comprising:
 a management module operative to receive a mosaic recipe;
 a strip operation management module operative to request high resolution geospatial imagery from an imagery storage at the direction of the management module and generate a strip processing queue for strip-level jobs to be performed relative to the high resolution geospatial imagery at least including dividing the geospatial images into image tiles of corresponding geographic relation to the geographically indexed tiles;
 a tile operation management module operative to generate a tile processing queue for tile-level jobs to be performed relative to the image tiles at the direction of the management module, wherein the queue includes parallel operation of non-dependent tile-level jobs; and
 a scalable cloud computing cluster operative to dedicate computing nodes for execution of said strip-level jobs and said tile-level jobs, said computing nodes operative to perform said strip-level jobs including the dividing of the geospatial images into tiles and to perform said tile-level jobs.

35. The system of example combination 34, wherein the high resolution geospatial images comprise at least one previously generated geospatial mosaic.

36. The system of any one of example combinations 34-35, wherein the strip-level jobs include applying dynamic range adjustment to the high resolution geospatial imagery.

37. The system of any one of example combinations 34-36, wherein the strip-level jobs include orthorectification, atmospheric compensation, and pan sharpening on the high resolution geospatial images.

38. The system of any one of example combinations 34-37, wherein the tile-level jobs include intra-tile cutline generation, inter-tile cutline generation, and cutline blending.

39. The system of any one of example combinations 34-38, wherein the strip operation management module is operative to generate a directed acyclic graph (DAG) comprising parent strip operations and dependent child strip operations and the strip processing queue is based on the strip-level jobs capable of being performed using the geospatial images as retrieved from the image storage.

40. The system of any one of example combinations 34-39, wherein the tile operation management module is operative to generate a directed acyclic graph (DAG) comprising parent tile operations and dependent child tile operations and the tile processing queue is based on tile-level jobs capable of being performed using the image tiles as processed by the scalable cloud computing cluster.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for generating a geospatial mosaic image from a plurality of geospatial images, comprising:
 (I) generating, in a front-end image processing system, a mosaic recipe comprising a definition of the identity of a selection of geospatial images and a stacking order thereof, wherein the selection of geospatial images are each associated with an area of interest that is divided into geographically indexed tiles, wherein the selection of geospatial images each include imagery within the selected tile and wherein at least one of the selection of geospatial images includes imagery outside of the selected tile;
 (II) generating, in a back-end image processing system, an orthomosaic image based on the mosaic recipe;
 (III) updating, in the front-end image processing system, the mosaic recipe, wherein the front-end image processing system comprises a user interface to update the mosaic recipe for the area of interest, wherein the updating further comprises:
  defining the area of interest as a selected geographic area, wherein the area of interest is divided into geographically indexed tiles;
  accessing image storage having geospatial images stored therein;
  retrieving the geospatial images from the image storage corresponding to the area of interest;
  rendering browse version images of at least a portion of the geospatial images from the image storage in a map display of the user interface, wherein the browse version images comprise low resolution image versions of corresponding geospatial images in the image storage; and
  receiving a selection, via the user interface, of one or more geospatial images for each geographically indexed tile based on the browse version images to update the mosaic recipe, wherein the updated mosaic recipe includes a definition of the identity of the geospatial images to be utilized in generation of an updated orthomosaic image from among the geospatial images at the same geographically indexed tile in the image storage; and
 (IV) executing the back-end image processing system to compile the updated orthomosaic image based on the updated mosaic recipe, comprising:

retrieving the geospatial images corresponding to the updated mosaic recipe from the image storage;

processing the geospatial images as the geospatial images are received using an image strip processor, the processing at least comprising dividing the geospatial images into image tiles of corresponding geographic relation to the geographically indexed tiles and storing the image tiles in the image storage;

determining available tile-level operations capable of being performed for each geographically indexed tile corresponding to the updated mosaic recipe for a given geographically indexed tile;

generating a queue of operations comprising the available tile-level operations to be performed relative to the image tiles; and executing the queue of operations using a scalable cloud computing cluster with parallel operation execution at a plurality of compute nodes of the scalable cloud computing cluster for non-dependent tile-based operations to generate the updated orthomosaic image.

2. The method of claim 1, further comprising:
automatically populating the area of interest with browse version images corresponding to said geospatial images in the map display of the user interface based on metadata information regarding the geospatial images corresponding to the area of interest.

3. The method of claim 2, further comprising:
searching the image storage of geospatial images based on metadata information;
presenting geospatial image search results comprising browse version images to the user in the map display, wherein the selection includes a geospatial image of the geospatial image search results.

4. The method of claim 1, further comprising:
creating an image stack of the browse version images comprising a plurality of zoom levels of the map display.

5. The method of claim 4, wherein a change to the selection of the one or more geospatial images is reflected in the image stack at the plurality of zoom levels.

6. The method of claim 1, wherein the geospatial images from the image storage comprise a previously generated geospatial mosaic, and wherein said determining available tile-level operations capable of being performed for each geographically indexed tile is based on the availability of said image tiles corresponding to the updated mosaic recipe for the given geographically indexed tile.

7. The method of claim 1, wherein the processing further includes the image strip processor applying dynamic range adjustment to the geospatial images.

8. The method of claim 7, wherein the processing further includes the image strip processor performing orthorectification, atmospheric compensation, and pan sharpening on the geospatial images.

9. The method of claim 1, wherein the tile-level operations comprise intra-tile cutline generation, inter-tile cutline generation, and cutline blending.

10. The method of claim 1, wherein the processing of the geospatial images using the image strip processor is governed by a directed acyclic graph (DAG).

11. The method of claim 10, wherein the processing of the geospatial images comprise performing strip-level operations in relation to the temporal order in which the geospatial images are received at the image storage with parallel operations performed according to the DAG.

12. The method of claim 9, wherein the tile-level operations are governed by a directed acyclic graph (DAG) comprising parent operations and dependent child operations, wherein the parallel operation execution is according to the DAG.

13. The method of claim 1, wherein the number of compute nodes used in said executing the queue of operations is based on a number of operations in the queue.

14. A system for generation of a geospatial mosaic image from a plurality of geospatial images, comprising:
a front-end image processing system, comprising:
an image server to request and serve geospatial images between network locations including requesting high resolution geospatial images from image storage;
a stack processing module operative to receive the high resolution geospatial images from the image server and generate an image stack comprising low resolution browse version images corresponding to the high resolution geospatial images and to store the browse version images in image storage; and
a user interface module operative to generate a web-based interface comprising a map display of an area of interest that is divided into geographically indexed tiles, the map display including said browse version images of corresponding geographical relation to the area of interest, the user interface module also operative to generate a mosaic recipe of said high resolution geospatial images for use in generation of the geospatial mosaic image based on a selection, via the web-based interface, of the browse version images displayed, wherein the mosaic recipe includes a definition of the identity of the high resolution geospatial images from among the geospatial images at the same geographically indexed tile in the image storage to be used in generation of the geospatial mosaic image, and wherein the user interface module is operative to update the mosaic recipe based on user selection;
wherein the browse version images of geospatial images correspond to the area of interest that is divided into geographically indexed tiles, and wherein the selection of geospatial images each include geospatial images of a selected tile, and wherein at least some of the initial selection of geospatial images include geospatial images of one or more adjacent tiles;
a back-end image processing system, comprising:
a management module operative to receive the mosaic recipe from the front-end image processing system;
a strip operation management module operative to request high resolution geospatial imagery at the direction of the management module and generate a strip processing queue for strip-level jobs to be performed relative to the high resolution geospatial imagery at least including dividing the geospatial images into image tiles of corresponding geographic relation to the geographically indexed tiles;
a tile operation management module operative to generate a tile processing queue for tile-level jobs to be performed relative to the image tiles at the direction of the management module, wherein the queue includes parallel operation of non-dependent tile-level jobs; and
a scalable cloud computing cluster operative to dedicate computing nodes for execution of said strip-level jobs and said tile-level jobs, said computing nodes operative to perform said strip-level jobs including the dividing of the geospatial images into tiles and to perform said tile-level jobs;

wherein the back-end image processing system is configured to generate an orthomosaic image based on the mosaic recipe and the selected tiles; and wherein the back-end image processing system is configured to generate an updated orthomosaic image based on the updated mosaic recipe.

15. The system of claim 14, wherein the user interface module is operative to automatically populate the area of interest of the map display with browse version images based on metadata information regarding the geospatial images corresponding to the area of interest.

16. The system of claim 15, wherein the image storage is searchable by the user interface module to define alternative browse version images for at least a portion of the area of interest.

17. The system of claim 14, wherein the image stack comprises a plurality of zoom levels of the map display.

18. The system of claim 17, wherein the stack processing module is operative to propagate a change in the selection of the browse version images through all of the zoom levels of the image stack.

19. The system of claim 14, wherein the high resolution geospatial images comprise at least one previously generated geospatial mosaic.

20. The system of claim 14, wherein the strip-level jobs include applying dynamic range adjustment to the high resolution geospatial imagery.

21. The system of claim 20, wherein the strip-level jobs include orthorectification, atmospheric compensation, and pan sharpening on the high resolution geospatial images.

22. The system of claim 14, wherein the tile-level jobs include intra-tile cutline generation, inter-tile cutline generation, and cutline blending.

23. The system of claim 14, wherein the strip operation management module is operative to generate a directed acyclic graph (DAG) comprising parent strip operations and dependent child strip operations and the strip processing queue is based on the strip-level jobs capable of being performed using the geospatial images as retrieved from the image storage.

24. The system of claim 14, wherein the tile operation management module is operative to generate a directed acyclic graph (DAG) comprising parent tile operations and dependent child tile operations and the tile processing queue is based on tile-level jobs capable of being performed using the image tiles as processed by the scalable cloud computing cluster.

25. A method for generating a geospatial mosaic image from a plurality of geospatial images, wherein a selection of the plurality of geospatial images each overlap a particular tile, and wherein at least one of the selection of the plurality of geospatial images includes imagery outside of the particular tile, the method comprising:

select the particular tile, query image storage for images that contain any portion of the selected particular tile and add the images to an image stack for that selected tile;

generating, in a front-end image processing system, a mosaic recipe, wherein the mosaic recipe comprises the identity of a selection of images and a stacking order corresponding to the selection of images;

generating, in a back-end image processing system, an orthomosaic image based on the mosaic recipe;

updating the mosaic recipe for an area of interest, wherein the updating further comprises:

selecting, via a user interface in the front-end image processing system, the area of interest as a selected geographic area, wherein the area of interest is divided into geographically indexed tiles;

accessing image storage having the geospatial images stored therein;

retrieving the geospatial images from the image storage corresponding to the area of interest at the same geographically indexed tile in the image storage;

rendering browse version images of at least a portion of the geospatial images;

receiving a selection, via the user interface, of one or more geospatial images for each geographically indexed tile based on the browse version images;

generating, via the back-end image processing system, an updated mosaic recipe for the particular tile within the area of interest based off of a previous mosaic recipe and based off of the selection received via the user interface; and compiling, in the back-end image processing system, an updated orthomosaic image based on the updated mosaic recipe, wherein the compiling further comprises:

retrieving the geospatial images corresponding to the updated mosaic recipe from the image storage;

processing the geospatial images as the geospatial images are received using an image strip processor, the processing at least comprising dividing the geospatial images into image tiles of corresponding geographic relation to the geographically indexed tiles and storing the image tiles in image storage;

determining available tile-level operations capable of being performed for each geographically indexed tile corresponding to the updated mosaic recipe for the particular geographically indexed tile; and generating the updated orthomosaic image.

26. The method of claim 25, wherein the determining available tile-level operations is based on the availability of said image tiles.

* * * * *